US012311981B2

(12) United States Patent
Chang et al.

(10) Patent No.: US 12,311,981 B2
(45) Date of Patent: May 27, 2025

(54) MACHINE-LEARNED COST ESTIMATION IN TREE SEARCH TRAJECTORY GENERATION FOR VEHICLE CONTROL

(71) Applicant: Zoox, Inc., Foster City, CA (US)

(72) Inventors: Yan Chang, Mountain View, CA (US); Aaron Huang, San Francisco, CA (US); Peter Scott Schleede, El Dorado Hills, CA (US); Gary Linscott, Seattle, WA (US); Marin Kobilarov, Baltimore, MD (US); Ethan Miller Pronovost, Redwood City, CA (US); Ke Sun, Foster City, CA (US); Xiangyu Xie, Baltimore, MD (US)

(73) Assignee: Zoox, Inc., Foster City, CA (US)

( * ) Notice: Subject to any disclaimer, the term of this patent is extended or adjusted under 35 U.S.C. 154(b) by 206 days.

(21) Appl. No.: 18/084,419

(22) Filed: Dec. 19, 2022

(65) Prior Publication Data

US 2024/0199083 A1 Jun. 20, 2024

(51) Int. Cl.
*B60W 60/00* (2020.01)
*B60W 30/12* (2020.01)
(Continued)

(52) U.S. Cl.
CPC ......... *B60W 60/0027* (2020.02); *G06N 20/00* (2019.01); *B60W 30/12* (2013.01);
(Continued)

(58) Field of Classification Search
CPC ........... B60W 30/12; B60W 30/18163; B60W 50/0097; B60W 60/0027; B60W 2554/20; B60W 2554/40; G06N 5/01; G06N 20/00
(Continued)

(56) References Cited

U.S. PATENT DOCUMENTS 11,386,161 B1 * 7/2022 Gupta ................ G06Q 30/0625
11,468,285 B1 * 10/2022 Tang .................... G06V 10/255
(Continued)

FOREIGN PATENT DOCUMENTS

CA    3139449 A1 *  5/2022  ........ B60W 60/0011
CA    3139480 A1 *  5/2022  ...... B60W 60/00276
(Continued)

OTHER PUBLICATIONS

Ferreira, et al., "Performance Improvement of Path Planning algorithms with Deep Learning Encoder Model," 2020 Joint IEEE 10th International Conference on Development and Learning and Epigenetic Robotics (ICDL-EpEpiRob48136.2020.9278050. (https://ieeexplore.ieee.org/document/9278050) (Year: 2020).*
(Continued)

*Primary Examiner* — Atul Trivedi
(74) *Attorney, Agent, or Firm* — Lee & Hayes, P.C.

(57) ABSTRACT

A machine-learned architecture for estimating the cost determined by a cost function for a prediction node of a tree search for exploring potential paths for controlling a vehicle may include two portions: a set up portion that includes models trained to process static data and a second portion that processes dynamic object data. The respective portions of the architecture may comprise various models that determine intermediate outputs that may be projected into a space associated with estimated cost. That estimated cost may identify an estimate of an output of the cost function for paths that are based on a particular prediction node of the tree search.

22 Claims, 9 Drawing Sheets

(51) Int. Cl.
*B60W 30/18* (2012.01)
*G06N 20/00* (2019.01)
(52) U.S. Cl.
CPC ... *B60W 30/18163* (2013.01); *B60W 2554/20* (2020.02); *B60W 2554/40* (2020.02)
(58) Field of Classification Search
USPC .......................................................... 701/25
See application file for complete search history.

(56) References Cited

U.S. PATENT DOCUMENTS

| | | | |
|---|---|---|---|
| 12,037,004 B2* | 7/2024 | Gordon | B60W 50/12 |
| 12,151,707 B1* | 11/2024 | Bagnell | B60W 60/001 |
| 2020/0310420 A1 | 10/2020 | Scorcioni | |
| 2021/0182911 A1 | 6/2021 | Xiao | |
| 2021/0294333 A1* | 9/2021 | Jing | B62D 15/021 |
| 2021/0295171 A1* | 9/2021 | Kamenev | G06N 3/088 |
| 2021/0347382 A1* | 11/2021 | Huang | G01S 19/393 |
| 2022/0005121 A1* | 1/2022 | Hayward | G06N 3/044 |
| 2022/0017115 A1* | 1/2022 | Biala | G01C 21/3407 |
| 2022/0019225 A1* | 1/2022 | Foley | G06V 10/806 |
| 2022/0105955 A1* | 4/2022 | Shridhar | G06V 20/56 |
| 2022/0116052 A1* | 4/2022 | Silberman | H03K 19/173 |
| 2022/0121691 A1* | 4/2022 | Barathi | G06N 3/048 |
| 2022/0126831 A1* | 4/2022 | Foil | G08G 1/16 |
| 2022/0176995 A1* | 6/2022 | Subramanian | B60W 30/08 |
| 2022/0185299 A1* | 6/2022 | Ye | B60W 60/00274 |
| 2022/0194419 A1* | 6/2022 | Houshmand | B60W 60/0023 |
| 2022/0196414 A1 | 6/2022 | Wang | |
| 2022/0196415 A1* | 6/2022 | Sameer | G01C 21/3461 |
| 2022/0197306 A1* | 6/2022 | Cella | G05B 19/41865 |
| 2022/0204016 A1* | 6/2022 | Lerner | B60W 60/0059 |
| 2022/0204055 A1* | 6/2022 | Watterson | B60W 60/00276 |
| 2022/0242440 A1* | 8/2022 | Kurtz | G01C 21/3815 |
| 2022/0245109 A1* | 8/2022 | Hatami-Hanza | G06N 7/01 |
| 2022/0250646 A1* | 8/2022 | Kobilarov | B60W 60/0011 |
| 2022/0332349 A1* | 10/2022 | Benou | G06F 18/251 |
| 2022/0332350 A1* | 10/2022 | Jha | B60W 60/0017 |
| 2022/0343241 A1* | 10/2022 | Jha | G08G 1/166 |
| 2022/0374723 A1* | 11/2022 | Blukis | G06V 10/82 |
| 2022/0388531 A1* | 12/2022 | Usikov | G06V 20/58 |
| 2022/0396289 A1* | 12/2022 | Li | G01C 21/3407 |
| 2022/0402485 A1* | 12/2022 | Kobilarov | B60W 30/0956 |
| 2023/0099334 A1* | 3/2023 | Pedersen | B60W 60/0011 |
| | | | 701/23 |
| 2024/0017738 A1* | 1/2024 | Vozar | B60W 60/00186 |
| 2024/0174256 A1* | 5/2024 | Narayanan | B60W 60/001 |
| 2024/0174265 A1* | 5/2024 | Pronovost | B60W 50/0097 |
| 2024/0174266 A1* | 5/2024 | Pronovost | G06N 5/01 |
| 2024/0199083 A1* | 6/2024 | Chang | B60W 50/0097 |
| 2024/0208546 A1* | 6/2024 | Pronovost | B60W 60/0027 |
| 2024/0211797 A1* | 6/2024 | Pronovost | G06N 3/044 |
| 2024/0217548 A1* | 7/2024 | Pronovost | G06N 20/00 |
| 2024/0265263 A1* | 8/2024 | Moskovitz | G06N 3/091 |
| 2024/0385318 A1* | 11/2024 | Tommaso | G06N 20/00 |

FOREIGN PATENT DOCUMENTS

| | | | | |
|---|---|---|---|---|
| CA | 3139481 A1 * | 5/2022 | | B60W 40/072 |
| CA | 3139575 A1 * | 5/2022 | | B60W 40/04 |
| CN | 109871032 B | 3/2022 | | |
| EP | 4002049 A1 * | 5/2022 | | G01C 21/3407 |
| JP | 2022544770 A * | 10/2022 | | |
| WO | WO-2022015797 A1 * | 1/2022 | | B60W 60/0025 |
| WO | WO-2022094624 A1 * | 5/2022 | | G06N 3/0427 |

OTHER PUBLICATIONS

Woof, et al., A Framework for End-to-End Learning on Semantic Tree-Structured Data, atXiv:2002.05707 [cs.LG] (https://arxiv.org/abs/2002.05707) (Year: 2002).*

Z. Li, A. Zhou, J. Pu and J. Yu, "Multi-Modal Neural Feature Fusion for Automatic Driving Through Perception-Aware Path Planning," in IEEE Access, vol. 9, pp. 142782-142794, 2021, doi: 10.1109/ACCESS.2021.3120720. (https://ieeexplore.ieee.org/document/9576743) (Year: 2021).*

Fereira, et al., "Performance Improvement of Path Planning algorithms with Deep Learning Encoder Model," 2020 Joint IEEE 10th International Conference on Development and Learning and Epigenetic Robotics (https://ieeexplore.ieee.org/document/9278050) (Year: 2020).*

Woof, et al., A Framework for End-to-End Learning on Semantic Tree-Structured Data, atXiv:2002.05707 (https://arxiv.org/abs/2002.05707) (Year: 2002).*

Zhou, et al., "Multi-Modal Neural Feature Fusion for Automatic Driving Through Perception-Aware Path Planning," in IEEE Access, vol. 9, pp. 142782-142794, 2021, doi: 10.1109/ACCESS.2021.3120720. (https://ieeexplore.ieee.org/document/9576743) (Year: 2021).*

PCT Search Report and Written Opinion mailed on Apr. 9, 2024 for PCT Application No. PCT/US2023/082768 from PCT Summary, 10 pages.

* cited by examiner

MACHINE-LEARNED COST ESTIMATION IN TREE SEARCH TRAJECTORY GENERATION FOR VEHICLE CONTROL

BACKGROUND

An autonomous vehicle may fail to navigate accurately and/or efficiently when normative operating conditions are altered, such as when roadway indicators are obscured (e.g., by snow, garbage, sand), degraded (e.g., burned out light, worn out lane markings), and/or invalidated (e.g., an obstruction partially blocks a lane, traffic signage and/or traffic cones indicate an alternate lane that conflicts with original lane markings). Moreover, various environmental factors and human and animal behavior may be erratic or unpredictable, which may further make autonomous vehicle navigation difficult. Existing solutions for dealing with non-standard driving conditions can be so computationally intensive that they may not be feasible for real-time vehicle operation on consumer grade hardware and/or at normal urban driving speeds.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
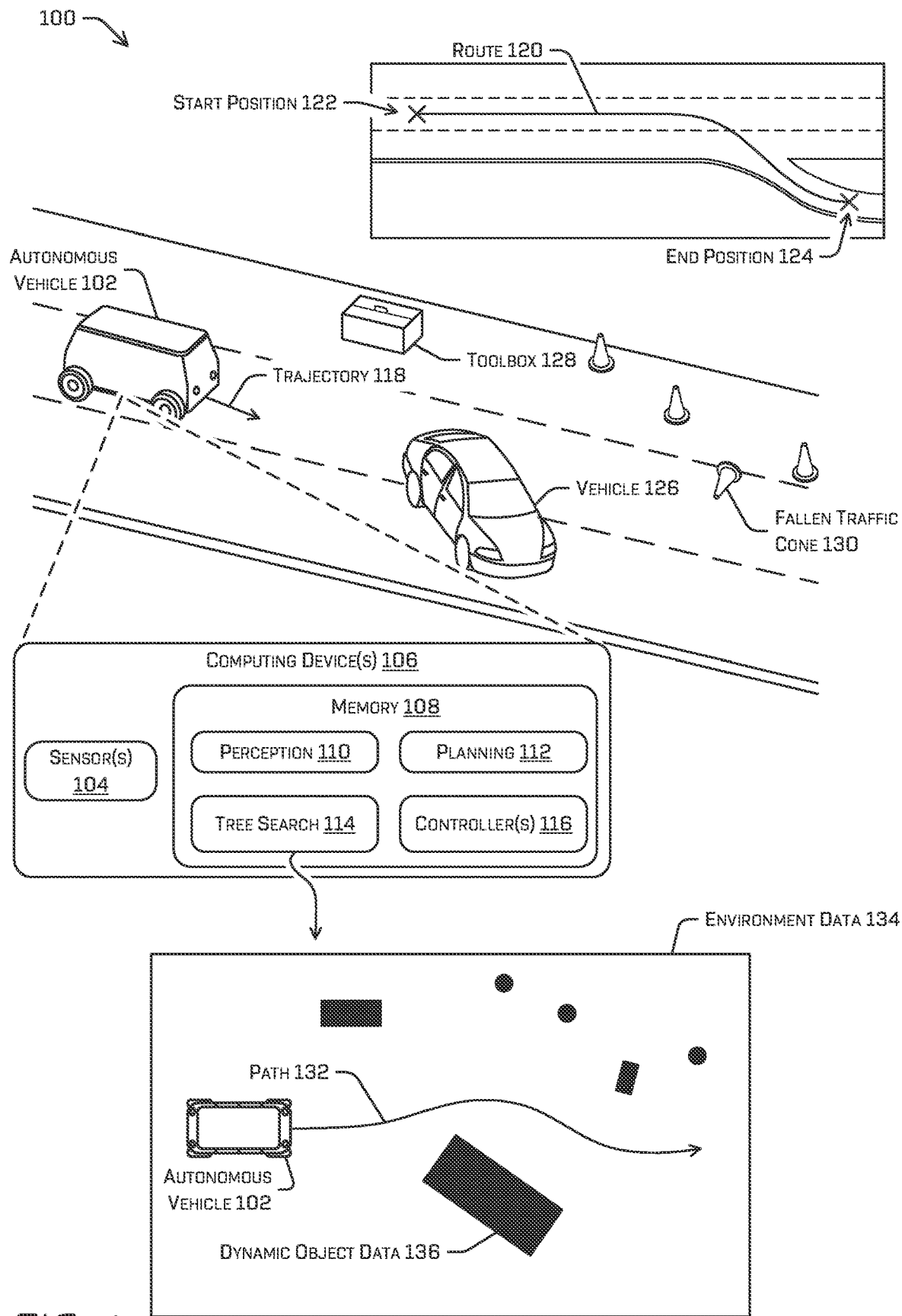
FIG. 1 illustrates an autonomous vehicle and an example scenario in which lane references (whether previously mapped or detected) may not be reliable for determining instructions for controlling motion of the vehicle.

As discussed above, autonomous vehicle control may be inefficient in instances where a more custom approach to path planning is required, such as when circumstances demand that a vehicle leave a lane, navigate an unmarked area or an area where lane markings are absolute, and/or the like. These situations may cause the autonomous vehicle to completely lane change, change routes, and/or need to transmit a request for help from a remote operator (or "teleoperator"), rather than a more nuanced approached such as slightly leaving a lane to pass an object. This application relates to techniques for increasing the number of scenarios the autonomous vehicle can safely and efficaciously navigate, e.g., without stopping, without stuttering, without the need to request help from a teleoperator, and/or by decreasing a likelihood of an impact occurring, particularly for aberrant circumstances but also for normative driving conditions. For example, the techniques discussed herein may decrease the occurrence of autonomous vehicle stops or stutters for normative situations such as traffic cones that have been knocked into the middle of a lane, when an object such as a vehicle is blocking part of two lanes, trash laying in the street, complex junctions with multiple vehicles and pedestrians, navigating in a gravel area with no lane markings, etc.

The techniques discussed herein may include an autonomous vehicle guidance system that generates a path for controlling an autonomous vehicle based at least in part on a tree search technique that alternately determines a candidate action and predicts a future state of the environment, dynamic object(s), and the autonomous vehicle responsive to the candidate action. The tree search may use a cost function to determine a cost associated with a predicted state and/or candidate action. In some examples, determining the cost using the cost function may include simulating future states of dynamic object(s) and/or the environment, which may be time consuming and computationally intensive. For example, to determine a first predicted state to further explore (to assess whether candidate action(s) to get to or from that state are feasible), cost(s) associated with a series of action(s) and/or predicted state(s) before and/or after that predicted state may be determined until an endpoint is reached, such as a horizon time along a route, to determine the cost associated with that first predicted state. This portion of the tree search may represent 40% or more of the latency of the tree search.

The guidance system discussed herein includes a tree search that includes a machine-learned architecture for estimating a cost for the tree search to replace most or all of the cost determinations by the cost function. This cost estimation architecture determines an estimated cost associated with a predicted state so that the tree search may select a lowest estimated cost predicted state to explore by determining whether candidate action(s) stemming from that predicted state may be associated with a lowest total cost, a total cost less than threshold, or a total cost less than total costs associated with n other total costs of different paths where n is a positive integer. A path may comprise series of candidate actions for achieving a series of predicted states.

The cost estimation architecture may receive a track and/or at least a current vehicle state associated with the autonomous vehicle, dynamic object data (which may include track(s) of dynamic object(s)), and/or environment state data. A track may identify a historical and/or current a pose (e.g., position and/or orientation), velocity, acceleration, object classification (this may or may not be immutable—e.g., the classification "vehicle" is likely to be immutable, whereas "cyclist" may alter since a cyclist may dismount and become a pedestrian), etc. of a detected object.

In some examples, an ML model or an ML model pipeline of a perception component may determine the dynamic object data based at least in part on sensor data. A dynamic object may be an object detected as moving, having moved, and/or being associated with an object classification associated with objects capable of movement. In some examples, another ML model may determine a static object map (e.g., a map indicating space occupied by static object(s) and/or "free space" in an environment) and/or one or more dynamic object maps (e.g., a map indicating a likelihood that a location in the environment will be occupied by a moving object or a stationary object that may move at a future time). These map(s) may be used for a cost determination portion of the tree search executed by the vehicle guidance system.

In some examples, a static object detection detected from sensor data may be included as part of the environment state data. The environment state data may further include map data that may have previously been generated that indicates the location and/or classification of roadways, lanes, signage, buildings, permanent objects, construction, known occlusion data, route generated by the vehicle (e.g., start position, end position, roadways to be used), etc.

The tree search discussed herein may alternately determine a candidate action and a predicted state of the environment associated with (e.g., at least partially responsive to) the candidate action at a future time step, another candidate action based on the predicted state of the environment, a second predicted state of the environment associated with the additional candidate action at a further future time step, and so on, up to a time horizon or a specified number of actions. A candidate action may indicate, for example, a trajectory for controlling motion of the vehicle, activating emitters of the vehicle (e.g., a turn signal, a headlight, a speaker), and/or the like. Each candidate action may be associated with a different action node and each predicted environment state may be associated with a prediction node of the tree.

As an initial operation, the tree search may determine, based at least in part on sensor data, a current state of an environment associated with the autonomous vehicle, which may include dynamic objects and/or static objects. This initial state may be associated with a root node. The root node may be a prediction node, in at least one example. The state of the environment may be indicated by a data structure associated with the root node/prediction node, in some examples.

Using this initial state, the tree search may determine one or more candidate actions for exploration. A candidate action may comprise a coarse maneuver, such as "stay in same lane," "lane change left," "execute right turn," "stop," or the like; and/or fine instructions such as a curve that defines and/or is associated with a position, steering angle, steering rate, velocity, and/or acceleration for the vehicle controller to track. In some examples, determining the one or more candidate actions for exploration may comprise transmitting the initial environment state (or the state that is indicated by a particular prediction node of a branch that is being explored at predictions nodes deeper than the initial node) to the planning component of the vehicle and receiving the set of candidate actions from the planning component. The planning component may be a nominal planning component of the vehicle that generates trajectory(ies) for controlling motion and/or operation of the vehicle in contrast to a contingent planning component that controls the vehicle during aberrant or emergency situations, although it is contemplated that a contingent planning component may additionally or alternatively provide generate candidate action(s) for use by the tree search. A tree search component may associate the one or more candidate actions of the set received from the planning component with action nodes.

In some examples, each candidate action may be associated with its own action node in the tree search. For example, a candidate action may be associated with an action node that is dependent on the root node, which indicates the state upon which the candidate action was based. The action node may, in some examples, identify the representative candidate action or, in other examples, the action node may indicate the representative and the two or more candidate actions associated therewith. In examples where action nodes have been merged, a lowest cost candidate action, from among the two or more candidate actions represented by the action node, may be selected for subsequent exploration and/or inclusion in a path.

The tree search may additionally or alternatively determine a cost associated with a candidate action. This cost may be based at least in part on a prediction of how close the candidate action would cause the autonomous vehicle to pass static object(s) and/or dynamic object(s); a proximity of the autonomous vehicle to non-drivable surface(s); a velocity, acceleration, and/or jerk associated with the candidate action; a short-term goal cost (e.g., displacement/progress along a route, parking, achieving a soft objective indicated by a teleoperations device—i.e., an objective that the autonomous vehicle is not required to meet but is factored into the cost determination to increase a likelihood of the autonomous vehicle operating in a particular manner), etc. In at least one example, a cost may be determined per action node and a total cost may be determined in association with the action node that includes a sum of the nodes composing a branch of the data structure comprising that action node (e.g., the cost of the action node and the cost of all parent nodes from which the action node depends, tracing back to the root node).

In some examples, determining the cost may be further based on a cost to go, which may be a prediction of what the cost would be to move the autonomous vehicle in a particular manner (e.g., a steering rate, a steering angle, a velocity, acceleration) and/or to a particular position according to a candidate action to achieve a future state. Naively, such a tree may consume exponential resources to explore all potential branches at successive timesteps (e.g., by branching to all potential actions at a time step). Such an exploration may be computationally prohibitive. According to the examples discussed herein, however, the estimated cost to go may be an estimate that doesn't require running a simulation to determine a more exact prediction of a cost to go, thereby decreasing the number of candidate actions explored to find a feasible, safe, and efficient path, thereby reducing the computational resources consumed by the tree search.

However, the cost function (and simulation) may be used to generate ground truth data and/or to determine a cost associated with the prediction node and/or candidate action(s) that were selected based at least in part on the estimated cost. For example, although the estimated costs may be used to identify a prediction node to explore, once a prediction node has been determined (by determining that the prediction node is associated with an estimated cost that is less than a threshold, less than n other estimated costs, and/or is the lowest estimated cost), the cost function (and simulation, in some instances) may be used to determine a cost associated with the prediction node and candidate action(s) stemming therefrom.

In some examples, the tree search may transmit a candidate action and the state upon which the candidate action was based (i.e., the initial state in this example) to a simulation and/or prediction system of a perception component of the vehicle. The simulation system may be part of a prediction component for generating estimated future trajectories for object(s). The simulation system may determine a predicted state of the environment based at least in part on the candidate action. The prediction generated by the simulation system may be associated with a future time and may be used to generate a prediction node that depends from the action node associated with the candidate action and indicates the predicted state of the environment that may result from implementing the candidate action. In some examples, should the cost estimation architecture fail to generate a useable estimated cost, such as in instances where the estimated cost falls outside a range of estimated cost values or outputs a nonce due to mathematical or coding error, the cost function may be used to determine a cost.

The cost estimation architecture discussed herein may be automatically trained, since the techniques discuss a method of automatic ground truth generation. Moreover, if or when the cost function is modified, such as by adding, removing, or modifying a factor upon which the cost function is based, the cost estimation architecture may be re-trained automatically without human intervention by determining a difference (a loss) between the estimated cost determined by the cost estimation architecture and the cost determined by the (updated) cost function. This loss may be backpropagated through the cost estimation architecture (e.g., altering parameter(s) of one or more components of the cost estimation architecture to reduce the loss).

During training, to balance the training data, high-cost trajectories may be purposefully generated so that the estimated costs are correctly modeled on a dataset comprising suitable numbers of examples of all trajectories. For example, a high-cost trajectory may be one that would result in a collision, one that passes very close to an object, one that results in a jerk that meets or exceeds a threshold, and/or the like. This may prevent overestimating (assigning too high a value) to estimated costs for trajectories that are safe and efficient, particularly when navigating in tight spaces is required, such as entering zones of dense traffic, passing double-parked vehicles, and the like.

The techniques discussed herein may reduce the computational load and latency for determining a path for controlling an autonomous vehicle, such as by generating estimated costs instead of using simulation to determine a more exact cost. This may allow the techniques discussed herein to be run real-time on consumer grade hardware. The techniques may decrease the number of candidate actions explored to find a feasible, safe, and efficient path, where a path may be sequential candidate actions that form a contiguous series. Increasing the number of explored candidate actions and/or paths may increase the granularity with which the autonomous vehicle can be controlled and may increase the number of scenarios that the autonomous vehicle can successfully and safely navigate. The techniques may also automatically generate accurate ground truth data with little to no human intervention and/or may automatically re-train the cost estimation architecture when the cost function is updated since the ground truth data may be automatically updated. This allows the system further autonomy and insight, since factors into the cost function are known. This is important because, traditionally, machine-learned model offer no insight into why they're generating the outputs they are.

Example Scenario

FIG. 1 illustrates an example scenario 100 including a vehicle 102. In some examples, the example scenario 100 may be a real-world scenario and/or the example scenario 100 may be a representation of a real-world scenario modeled as a simulated scenario. In examples where the example scenario 100 is a simulated scenario, the example scenario 100 may be determined based at least in part on input received at a user interface of a computing device (e.g., a user of the computing device may define the environment, objects therein, and/or characteristics thereof) and/or the example scenario 100 may be based at least in part on log data received from one or more autonomous vehicles. The log data may be based at least in part on sensor data received at an autonomous vehicle, perception data generated by a perception component, and/or instructions generated by a planning component. In some examples, the autonomous vehicle may store the log data and/or periodically transmit the log data to a remote computing device.

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein and an example where scenario 100 is a real-world example, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 104 on the vehicle 102 and in a simulation, one or more of sensor(s) 104 may be simulated. In some examples, the position of a simulated sensor may correspond with a relative position of one of the sensor(s) 104 to the vehicle 102.

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, tree search 114, and/or controller(s) 116. In some examples, the planning component 112 may comprise the tree search 114 and a cost function that may be part of the tree search 114. The perception component 110, the planning component 112, the tree search 114, and/or the controller(s) 116 may include one or more machine-learned (ML) models and/or other computer-executable instructions. For example, the tree search 114 may comprise the cost estimation architecture discussed herein.

In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, localization information (e.g., where the vehicle 102 is in the environment relative to a map and/or features detected by the perception component 110), and/or a path generated by the tree search 114. The trajectory 118 may be one of the candidate actions determined by the tree search 114.

The trajectory 118 may comprise instructions for controller(s) 116 of the autonomous vehicle 102 to actuate drive components of the vehicle 102 to effectuate a steering angle and/or steering rate, which may result in a vehicle position, vehicle velocity, and/or vehicle acceleration that tracks the path generated by the guidance system. For example, the trajectory 118 may comprise a target heading, target steering angle, target steering rate, target position, target velocity, and/or target acceleration for the controller(s) to track as part of the path. For example, the coarse path generated by the tree search 114 according to the techniques discussed herein may indicate vehicle positions, headings, velocities, and/or entry/exit curvatures at 500 millisecond time intervals and a smooth path output by the tree search 114 may comprise such points at a 10 or 100 millisecond interval, which may correspond to a time interval associated with the trajectory 118. In some examples, the controller(s) may comprise software and/or hardware for actuating drive components of the vehicle 102 sufficient to track the trajectory 118 (and/or path, which may comprise multiple trajectories in one example).

In the example scenario 100, the autonomous vehicle 102 has received and/or determined a route 120 defining a start position 122, an end position 124, and a curve between the start position 122 and the end position 124 (note that the curve comprises a straight line and/or one or more curves). For example, the planning component 112 may have determined the route 120 based at least in part on sensor data and an end position received as part of a mission (e.g., from a passenger, from a command center). As used herein, references to a "position" may comprise both a location and/or a pose (e.g., position and/or orientation/heading of the vehicle). In some examples, the route may not comprise end position 124 and may additionally or alternatively comprise a target position, such as a target lane, target relative position (e.g., 10 feet from roadway edge), target object (e.g., follow vehicle, follow passenger, move toward an individual hailing the vehicle), etc.

As the vehicle operates to reach the end position 124, the autonomous vehicle 102 may encounter a scenario like example scenario 100 in which a planner that is reliant on a lane reference (e.g., a relative spatial designation determined based at least in part on a map and/or localizing the autonomous vehicle 102) to generate a path may not accurately and/or efficiently generate a path. For example, a variety of objects (e.g. a blocking vehicle 126, toolbox 128, and fallen traffic cone 130) cumulatively block all three lanes of the depicted roadway, which may cause another planner to stop the vehicle and/or call teleoperations because no one lane has sufficient room for the autonomous vehicle.

However, the tree search 114 discussed herein may generate a path 132 based at least in part on environment data 134, map data, and/or dynamic object data 136 that may be based at least in part on sensor data captured by sensor(s) 104 and/or retrieved from memory. For example, the perception component 110 may determine the dynamic object data 136 based at least in part on the sensor data and may determine part of the environment data 134, in some cases, such as light states of traffic lights indicated in the map data, static object data that isn't indicated in the map data (e.g., movable inanimate objects, newly erected/constructed objects, construction zones). Static data, whether as part of the map data or the environment data 134, may indicate a likelihood that an object exists at a location in the environment, a classification associated with the object (e.g., signage, movable static object) and the dynamic data may indicate a likelihood that an object occupies or will occupy a location in the environment. In some instances, the dynamic data may comprise multiple frames associated with different times steps at intervals up to a prediction horizon (i.e., a maximum time/distance for which dynamic data is predicted). In some examples, the tree search 114 may always be running on the vehicle, i.e., the guidance system may be the nominal planning component, or, in an alternate example, the tree search 114 may be a contingent planning component or a planning component for special circumstances (e.g., when a nominal planning component isn't able to find a valid path).

The techniques discussed herein may additionally or alternatively comprise determining dynamic data based at least in part on a mode of operation of the vehicle. For example, the dynamic data may comprise a first prediction associated with a first vehicle mode and a first time and a second prediction associated with a second vehicle mode and the first time. The vehicle modes may include mission-level modes, such as passenger pickup, passenger transit, passenger drop-off, or the like; path or trajectory-level modes such as maintaining trajectory, slowing to a stop, transitioning lanes, executing a righthand turn, or the like; and/or signal modes, such as activating a speaker, activating a turn light, flashing headlights or high beams, or the like. The autonomous vehicle's behavior and signals may affect decisions and behavior made by other entities in the vicinity of the autonomous vehicle 102 and may thereby affect the predicted motion of other objects.

In some examples, the perception component 110 may receive sensor data from the sensor(s) 104 and determine data related to objects in the vicinity of the vehicle 102, such as the static and/or dynamic data. The depicted example of the environment data 134 comprising static and/or dynamic data is a top-down representation of such data, but any representation of the static and/or dynamic data is contemplated, such as a heat map, object classifications associated with detected objects, instance segmentation(s), semantic segmentation(s), two and/or three-dimensional bounding boxes, tracks, etc. The perception component 110 may additionally or alternatively determine route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., object detections and/or tracks discussed herein), etc.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise radar data, which the perception component 110 may receive as input. The perception component 110 may be configured to detect as many objects and information about the environment as possible to avoid failing to account for an event or object behavior that should be taken into account by the planning component 112 in determining the trajectory 118.

The object classifications, which may be part of the environment data 134, dynamic object data 136, and map data may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading, although in some examples the track may indicate current and historical characteristics detected in association with an object. In some examples, the perception component 110 may comprise a prediction component that may determine the predicted portion of the track, which may comprise a predicted position, heading, steering rate, velocity, acceleration, classification (for those classifications that are malleable, such as cyclists that may become pedestrians), etc. The prediction component may comprise a simulation component, machine-learned model, or in additional or alternate examples, the prediction component may comprise a Kalman filter or the like. The perception component 110 may be used to determine the environment state indicated by a prediction node as part of the tree search discussed herein. For example, the environment state may comprise current and/or predicted environment data 134.

The data produced by the perception component 110 may be collectively referred to as perception data. Once/as the perception component 110 generates perception data, the perception component 110 may provide the perception data to the planning component 112 and/or the tree search 114. In some examples, perception data may comprise outputs of sensor specific pipelines (e.g., vision, lidar, radar) and/or hybrid sensor pipelines (e.g. vision-lidar, radar-lidar).

The planning component 112 may use the perception data received from perception component 110 and/or a path received from the tree search 114, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; determine a smooth trajectory from a coarse trajectory received from the tree search 114; generate, substantially simultaneously and based at least in part on the path and perception data and/or simulated perception data (which may further include predictions regarding detected objects in such data), a plurality of potential trajectories for controlling motion of the vehicle 102 in accordance with a receding horizon technique (e.g., 1 micro-second, half a second, 2 seconds, 5 seconds, 10 seconds, or any other near-term time period) to control the vehicle to traverse the route (e.g., in order to avoid any of the detected objects); and select one of the potential trajectories as a trajectory 118 of the vehicle 102 that may be used to generate a drive control signal that may be transmitted to the controller(s) 116 for actuating drive components of the vehicle 102. FIG. 1 depicts an example of such a trajectory 118, represented as an arrow indicating a target heading, target steering angle, target steering rate, target position, target velocity, and/or target acceleration for the controller(s) to track, although the trajectory itself may comprise instructions for controller(s), which may, in turn, actuate a drive system of the vehicle 102.

In some examples, the tree search 114 may be a secondary guidance system to a nominal guidance system of the planning component 112. In some examples, the planning component 112 may generate the one or more candidate actions for the tree search discussed herein and associated with action node(s). The planning component 112 may receive a trajectory or path from the nominal guidance system and may receive the path generated by the tree search 114 as discussed herein. That path received from the tree search 114 may be treated by the planning component 112 as a contingent path—for example, the planning component 112 may rely on an output of the nominal guidance system of the planning component 112 unless or until the output of the nominal guidance system would cause the vehicle 102 to stop or call teleoperations or fails to output a feasible, impact-free, and/or economical path or trajectory. In such an instance, the planning component 112 may switch to using the path output by the tree search 114. In additional or alternate examples, the planning component 112 may use the path output by the tree search 114 to generate a trajectory all the time, in certain regions (e.g., in areas with no lane references), based at least in part on sensor data and/or perception data, or the like. In some examples, the tree search 114 may execute the tree search discussed herein, which may include managing generation of the action node(s) (e.g., by sending requests to an application programming interface (API) associated with the planning component 112 and receiving candidate action(s) in response), and/or managing generation of the prediction nodes (e.g., by sending requests to an API associated with a prediction component of the perception component 110 and receiving current and/or predicted environment state data), etc.

The tree search 114 may comprise one or more GPUs or may be communicatively coupled with one or more GPUs (e.g., via a publish-subscribe messaging system, via a data bus—such as a Scalable Link Interface, etc.) and the techniques discussed herein may be parallelized and disseminated to threads of the GPUs, although it is contemplated that the techniques discussed herein may comprise at least portions that are serial, operated on CPUs, ASICs, FPGAs, or any other processor.

Example System

Figure 2:
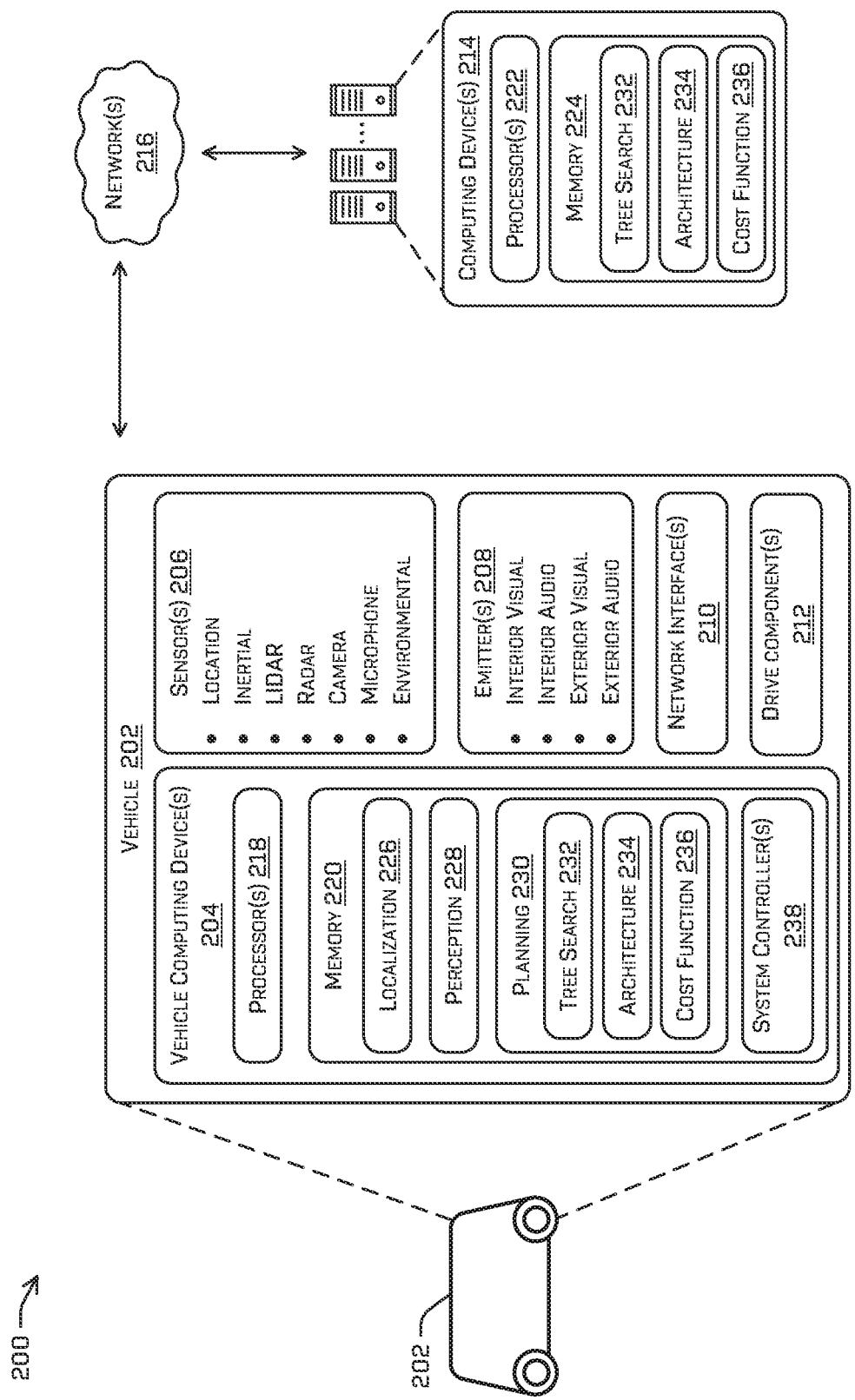
FIG. 2 illustrates a block diagram of an example autonomous vehicle architecture comprising a guidance system for unstructured path planning that includes a cost estimate architecture.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, tree search 232, (cost estimation) architecture 234, cost function 236, and/or system controller(s) 238—zero or more portions of any of which may be hardware, such as GPU(s), CPU(s), and/or other processing units. Perception component 228 may represent perception component 110, planning component 230 may represent planning component 112, and tree search 232 may represent tree search 114.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. For example, the prediction component may be a simulation component although, in an additional or alternate example, the prediction component and the simulation component may be separate components—the prediction component may be a computationally lighter simulation component that executes on the vehicle whereas the simulation component may be a more computationally intensive simulation component that executes on computing device(s) 214. For example, the prediction component might use a top-down representation of the environment, whereas the simulation component might use a three-dimensional representation of the environment. Regardless, the perception component 228 (and the prediction component thereof and/or simulation component) may work in concert with the tree search 232 to determine the environment state discussed herein. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 228 may include a prediction component that predicts actions/states of dynamic components of the environment, such as moving objects. In some examples, the perception component 228 may include the simulation component as part of the prediction portion of the perception component 228. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, the memory 220 may further store map data, which is undepicted, and this map data may be retrieved by the planning component 230 as part of generating the environment state data discussed herein. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 230 may comprise hardware/software-in-a-loop in a simulation (e.g., for testing and/or training the planning component 230), the planning component 230 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

The planning component 230 may be a primary component for determining control instructions for the vehicle 202, such as during operation of the vehicle 202 in nominal conditions; however, the planning component 230 may further comprise and/or the vehicle 202 may additionally comprise separately from the planning component 230 a tree search component 232. The tree search 232 may determine a trajectory and/or path for controlling the vehicle contemporaneously with the planning component 230, such as to determine a contingent trajectory and/or path for controlling the vehicle 202 when a trajectory determined by the planning component 230 fails to be generated (e.g., the planning component 230 can't determine a suitable trajectory that avoids objects) and/or that violates a comfort metric, such as a threshold acceleration and/or jerk, or a rule of the road. Additionally or alternatively, the tree search 232 may be the primary means of generating a trajectory for controlling the vehicle. In some examples, the raw output of the tree search 232 may be a series of control states (e.g., position and/or heading of the vehicle, steering angle, and/or velocity) that may be used to generate the trajectory, i.e., the commands that the drive component(s) 212 may use to actuate the drive system of the vehicle 202.

In some examples, the tree search 232 may comprise a search algorithm such as, for example D*, D*lite, Focused Dynamic A*, A*, LPA*, Dijkstra's algorithm, and/or the like, although other search algorithms for searching and/or generating a directed graph and/or a weighted directed graph may be used. Additionally or alternatively, the tree search 232 may determine a sparse partially observable tree (DESPOT) determined according to a partially observable Markov decision process (POMDP). The tree search 232 may manage determining the action node(s) and/or prediction node(s) of the tree search by transmitting a request for the planning component to generate candidate action(s) based at least in part on an environment determined in association with a prediction node and/or one or more heuristic candidate action(s) may be used, such as various patterns of braking, accelerating, and/or steering (e.g., maintaining a current velocity and steering angle, staying in a lane, executing various typical turns or other maneuvers). The tree search 232 may receive map data and an initial state of the environment from the perception component 228 (i.e., in association with a root node of the tree search), which may include static object detections to be aggregated with the map data to create environment state data, dynamic object data, self-reflexive vehicle 202 data (e.g., received from the localization component 226), and/or track(s) associated with the vehicle 202 and/or one or more detected dynamic object(s).

In some examples, the tree search 232 may transmit this initial environment state to the planning component 230 and may receive one or more candidate actions from the planning component 230. For examples that use the cost function 236 to determine the cost discussed herein, the tree search 232 may transmit at least one of these one or more candidate actions to the simulation component and/or a prediction component of the perception component 228, which may determine a predicted state of the environment that is based at least in part on the candidate action. In examples where the architecture 234 is used to determine an estimated cost, the architecture 234 uses the environment state data, dynamic object data, and/or track(s) to generate the estimated cost according to the techniques discussed herein. This process may be iterated until a time horizon, distance, progress along a route, target position, and/or suitable path is reached/determined.

For example, the time horizon may be a length of time into the future from a current time (e.g., 500 milliseconds, 1 second, 2 seconds, 5 seconds, 8 seconds, 10 seconds). This length of time may be associated with controlling the vehicle for the next m units of time, where m is a positive integer. A distance may define a total distance covered by the constituent actions that make up a path, whereas progress along a route may be the displacement along/with reference to a route. In an additional or alternate example, a target position may be used to terminate the tree search. For example, upon determining a path that reaches the target position in the environment, the tree search may output that path and terminate. In an additional or alternate example where the tree search is used when a nominal planning component failed to create a valid trajectory or path, the tree search may terminate upon determining a valid path (e.g., a path that is impact-free and conforms to a rule set, which may specify comfort metrics, conformance to laws, etc.). In additional examples, iterations may continue until an objective is achieved (e.g., a successful lane change, a successful merge, or any other completed action). In any one or more examples, any combination of the above may further be used as decision points for branching the tree.

The architecture 234 may operate on the vehicle 202 and/or on the computing device(s) 214. In some examples, the architecture 234 may execute on computing device(s) 214 during training or re-training of the architecture 234 (when the cost function 236 has been modified) and may operate on the vehicle 202 at inference and/or for re-training when a modified cost function is transmitted to the vehicle 202 from the computing device(s) 214. The architecture 234 may determine an estimated cost associated with a prediction node of the search tree, which identifies an estimated minimum cost or average cost of the candidate actions to arrive at that prediction node and/or to travel from that prediction node.

The architecture 234 may receive environment state data (which may comprise a data structure fusing map data and current environment state data determined by the perception component 228, such as static object detection(s) and/or traffic light, vehicle indicator, or other signal states), track(s) of the vehicle 202 and one or more dynamic object(s) detected as being in the environment (e.g., indicating a current and historical (when available) state of the vehicle or object, such as the position, orientation, velocity, classification, and/or the like over time up to a current time), and predicted states of dynamic objects, signals (e.g., physical indicators, such as traffic lights, vehicle turn indicators, railroad crossing indicators, and the like), and/or the vehicle 202 up to a target prediction node that is the subject of the cost estimate. The architecture 234 may use this data, as described herein, to determine a cost estimate associated with a target prediction node.

Note that, although a single cost estimate associated with a prediction node, this may be a simplification for the sake of comprehension. In practice, the output of the architecture 234 may comprise a set of estimated costs, each of which is associated with a different prediction node of a tree search, such as the prediction nodes of a furthest layer explored by the tree search up to that point. Also, the prediction nodes may be associated with multiple candidate actions that may stem therefrom, so the estimated cost may be considered a rough estimate of the average costs of or minimum cost among those different candidate actions, depending on how the training is set up. For example, during training, when a loss is determined by determining a difference between a cost determined by the cost function and the estimated cost determined by the architecture 234, the cost function selected for determining the difference may either be an average cost of all the costs associated with the different candidate actions stemming from the target prediction node or it may be the minimum cost associated with the candidate action that was used to generate a path having a lowest total cost.

During inference, the cost estimate architecture 234 may be used to determine a prediction node to explore based at least in part on determining that the prediction node is associated with a lowest estimated cost from among multiple prediction nodes and their respective estimated costs. In some examples, the tree search 232 may use the cost function 236 to determine costs associated with candidate actions associated with that prediction node to verify that the prediction node is a good candidate for exploration. Note that "exploring" a prediction node means using that prediction node as the target future vehicle 202 state (e.g., a future position, heading, steering angle, steering rate, velocity, and/or the like) for candidate actions to arrive at or for determining candidate actions starting at the future vehicle 202 state indicated by that prediction node. In additional or alternate examples, the prediction node determined for exploration may be determined based at least in part on determining that the estimated cost associated with the prediction node is less than a threshold estimated cost or that the estimated cost is lower than n number of estimated costs associated with different prediction nodes, where n is a positive integer that may be 80%, 90%, 95%, 98%, 99%, or some other percentage of the total number of prediction nodes for which estimated costs where determined.

In some examples, determining the cost using the cost function may comprise simulating future states of dynamic object(s) in the environment. In some examples, this classification may include determining whether a dynamic object is a reactive or passive dynamic object, as discussed in more detail in U.S. patent application Ser. No. 17/394,334, filed Aug. 4, 2021, the entirety of which is incorporated herein. For example, a simulation component may comprise an agent filter that may comprise a machine-learned model trained to classify dynamic objects detected by the perception component 228 as being reactive or passive. In at least one example, the classification need not be binary and may be a score, such as a number between 0 and 1, where 0 indicates that an object is passive and a 1 indicates that an object is reactive. In some examples, the agent filter may receive a track associated with a dynamic object and a candidate action of the vehicle as input and may determine whether the dynamic object is passive or reactive according to a binary classification or a regression, as discussed above. A purely passive agent will not change its behavior at all based on the behavior of the vehicle 202/the candidate action, whereas an action taken by a reactive object is highly likely to be affected by action(s) of the vehicle 202. In an additional or alternate example, the agent filter may determine a likelihood (e.g., a covariance, a posterior probability) that a dynamic object will modify an action associated therewith based on an action of the vehicle 202. Dynamic objects associated with a likelihood meeting or exceeding a threshold likelihood may be classified as being reactive, whereas another dynamic object associated with a likelihood that doesn't meet the threshold may be classified as a passive object.

During training, instead of reserving use of the cost function 236 for a prediction node that is determined for exploration, the cost function 236 may be used on every prediction node since real-time operation is not necessary and to determine the actual lowest cost prediction node. This allows the system to self-generate ground truth data by the cost function 236. Moreover, any adjustments to the cost function 236 may allow these changes to be reflected in the ground truth data used for training the architecture 234, thereby automatically updating the architecture 234 to reflect any changes in the cost function 236.

For example, if the cost function 236 has been modified at computing device(s) 214, the architecture 234 may be retrained by re-determining the costs associated with the prediction nodes by the updated cost function, and the updated cost function and re-trained architecture may be transmitted from computing device(s) 214 to vehicle 202 to replace the architecture 234 and cost function 236.

In some examples, a two or three-dimensional representation of the scenario indicated by the environment state data, dynamic object data, and predicted state data may be generated by a simulation component (or prediction component of the perception component 228) as simulation data. The simulation data may be used to instantiate and execute a simulation. During the simulation, a candidate action may be used to control motion of a simulation of the vehicle 202 during execution of the simulation. A two-dimensional representation may include, for example, a top-down representation of the environment and the detected object(s) and a three-dimensional representation may comprise position, orientation, geometric data (e.g., a polygon representation, a digital wire mesh representation), material, lighting, and/or lighting data. Both representations may comprise movement data associated with one or more objects of the environment and/or may include occlusion data indicating portion(s) of the environment that are occluded to one or more sensors of the vehicle 202. This occlusion data may further indicate occlusions to different classes of sensors, such as portion(s) of the environment occluded to visible light cameras but not to radar or lidar, for example. In additional or alternate examples, the simulation component may comprise a computational construct (e.g., an algorithmic and/or mathematical representation used by a computing device in performing the operations described that is not intended to be (and/or incapable of being) visualized).

The scenario data may comprise a two-dimensional representation of an environment associated with a scenario, objects contained therein, and characteristics associated therewith, all of which may be part of a scenario associated with the log data. For example, the scenario data may identify a position of an object, an area occupied by the object, a velocity and/or acceleration associated with the object, whether the object is static or dynamic, an object type associated with the object (e.g., a classification such as "pedestrian," "bicyclist," "vehicle," "oversized vehicle," "traffic light," "traffic signage," "building," "roadway," "crosswalk, "sidewalk"), and/or other kinematic qualities associated with the object and/or the object type (e.g., a friction coefficient, an elasticity, a malleability). As regards the environment itself, the scenario data may identify a topology of the environment, weather conditions associated with the environment, a lighting state (e.g., sunny, cloudy, night), a location of light sources, and/or the like. In some examples, topology, fixed object (e.g., buildings, trees, signage) locations and dimensions, and/or the like associated with the scenario data may be generated based at least in part on map(s). In some examples, the scenario data may be used (e.g., by the simulation component) to instantiate a two- or three-dimensional representation of the object and/or the simulated environment may be instantiated based at least in part on map data (e.g., which may define a topology of the environment; the location and/or dimensions of fixtures such as signage, plants, and/or buildings) and/or the scenario data.

Additionally or alternatively, the simulation may include a simulated object that is controlled by an agent behavior model as discussed in more detail in U.S. Pat. No. 11,338,825, filed Jun. 1, 2020, the entirety of which is incorporated by reference herein, in addition to or instead of a nominal prediction component of the simulation component or a prediction component of the perception component 110. The agent behavior model may control simulated motion of a simulated representation of a dynamic object, such as a reactive dynamic object. In some examples, the simulation may be executed as part of a forecasting/prediction operation, so one or more simulations may be executed to determine a prospective scenario (e.g., predicted environment state data) based on a candidate action generated according to the tree search discussed herein.

In some examples, a simulated sensor may determine simulated sensor data based at least in part on a simulation executed by the simulation component. For example, U.S. patent application Ser. No. 16/581,632, filed Sep. 24, 2019, the entirety of which is incorporated by reference herein, discusses this in more detail. In an additional or alternate example, the simulation executed by the simulation component may itself comprise simulated sensor data. The perception component 228 (e.g., a copy thereof, which may comprise software and/or hardware, which may include hardware-in-the loop simulation) may receive such sensor data and/or simulated sensor data may output perception data that is provided as input to the planning component 230. The planning component may use the perception data to determine instructions for controlling motion of the vehicle 202, which may be used to control at least the simulated representation of the vehicle 202 in the simulation and, in some examples, may be additionally used to control real-world motion of the vehicle 202, such as in examples wherein the simulation component executes on-vehicle during real-world operation.

The memory 220 and/or 224 may additionally or alternatively store a mapping system, a planning system, a ride management system, simulation/prediction component, etc.

As described herein, the localization component 226, the perception component 228, the planning component 230, architecture 234, cost function 236 and/or other components of the system 200 may comprise one or more ML models. For example, localization component 226, the perception component 228, the planning component 230, architecture 234, and/or cost function 236 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, the entirety of which is incorporated by reference herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 230 may generate instructions based at least in part on perception data generated by the perception component 228 and/or simulated perception data and transmit the instructions to the system controller(s), which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Figure 3:
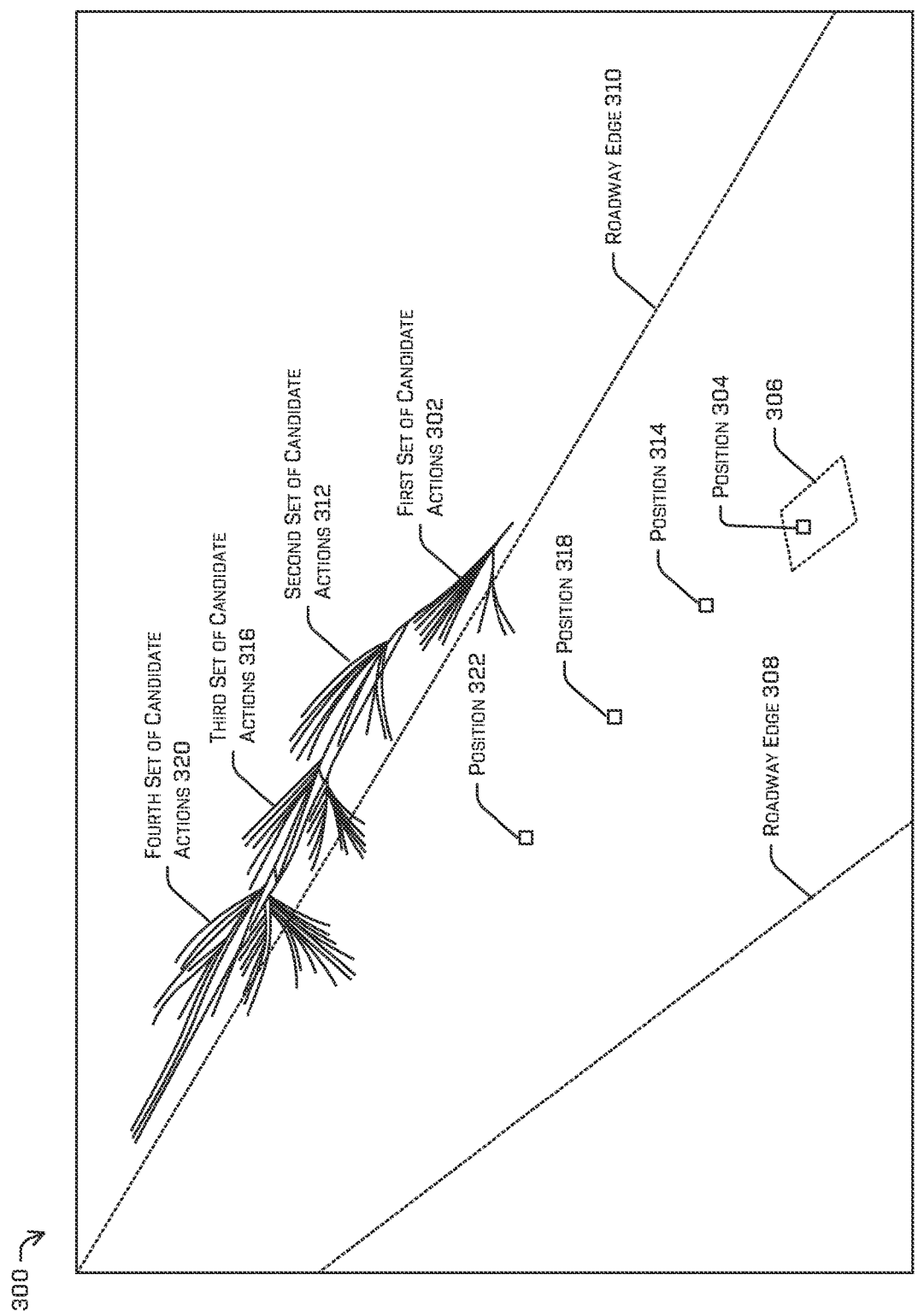
FIG. 3 illustrates a three-dimensional representation of sets of different candidate actions generated for a branch of the tree search discussed herein for different time steps/locations in the environment associated with the branch.

Example Depiction of a Series of Path Comprising Prediction Nodes and Candidate Actions FIG. 3 illustrates a three-dimensional representation 300 of four different sets of candidate actions (i.e., trajectories in the depicted example) generated at four different action layers of the tree search. The representation 300 may be a visual depiction of a determinized sparse partially observable tree (DESPOT) determined according to a partially observable Markov decision process (POMDP). Representation 300 also depicts a path that comprises a series of prediction nodes and respective candidate actions associated therewith. For the sake of simplicity just the position indicated by each of the series of prediction nodes is depicted, although prediction nodes may indicate additional data such as, for example, heading, steering angle, and/or velocity.

The first set of candidate actions 302 were generated based at least in part on a position 304 of the vehicle 202. These candidate actions 302 may be determined based at least in part on an orientation, velocity, acceleration, steering rate, environment state data indicated in association with a root node, etc. associated with operation of the vehicle to reach the state indicated by a first prediction node, which includes the position 314 (and may further include heading, steering angle, and velocity, for example). A candidate action may include instructions for reaching a prediction node, such as a steering angle, steering rate, velocity, and acceleration to achieve the state indicated by a prediction node. The space occupied by the vehicle is represented at 306 as a dashed line. FIG. 3 also represents two roadway edges, roadway edge 308 and roadway edge 310. The height of a candidate action in the figure indicates a velocity and/or acceleration associated with the candidate action.

A second set of candidate actions 312 may be generated based at least in part on selecting a first candidate action of the first set of candidate actions 302 and based at least in part on a final position 314, orientation, velocity, steering rate, etc. at a predicted state that the first candidate action would cause the vehicle to accomplish upon concluding execution of the first candidate action and environment state data. The second set of candidate actions 312 may additionally or alternatively be determined based at least in part on state indicated by prediction node determined based at least in part on the first candidate action.

The third set of candidate actions 316 may similarly be based at least in part on selection of a second candidate action from among the second set of candidate actions 312 that results in a particular predicted state; environment state data generated in association therewith; and/or the final position 318, orientation, velocity, steering rate, etc. that the second candidate action would effect. The fourth set of candidate actions 320 may similarly be based at least in part on selection of a third candidate action from among the third set of candidate actions 316; state data generated in association therewith; and/or the final position 322, orientation, velocity, steering rate, etc. (i.e., predicted state) that the third candidate action would affect.

Example Path Generation Using a Tree Search and Cost Estimation Architecture

Figure 4A:
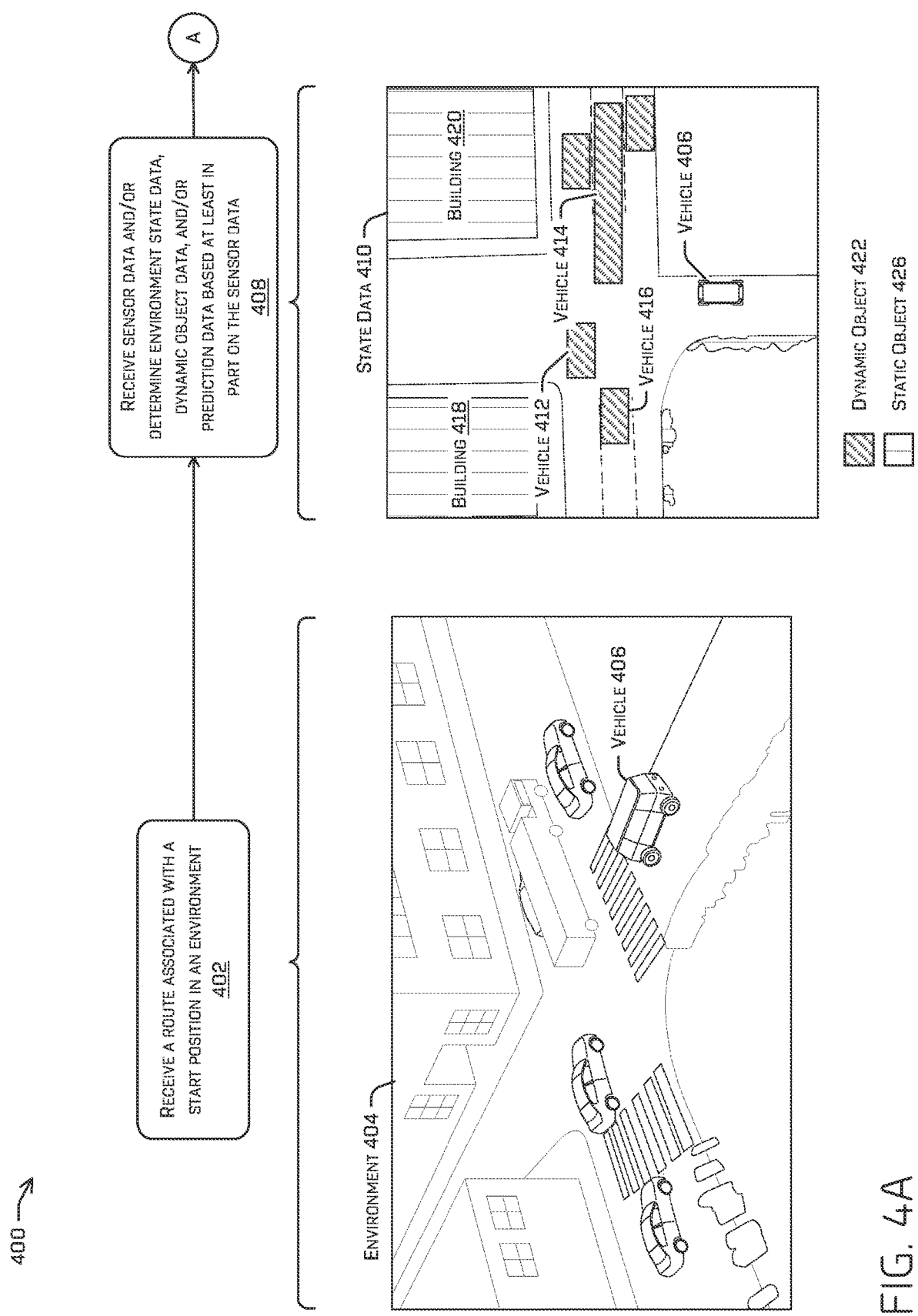
FIGS. 4A-4C illustrate a pictorial flow diagram of an example process for generating a path for controlling an autonomous vehicle using a tree search that employs an estimated cost. They also depict a process for verifying a trajectory and/or generating ground truth data for training the cost estimate architecture.
Figure 4B:
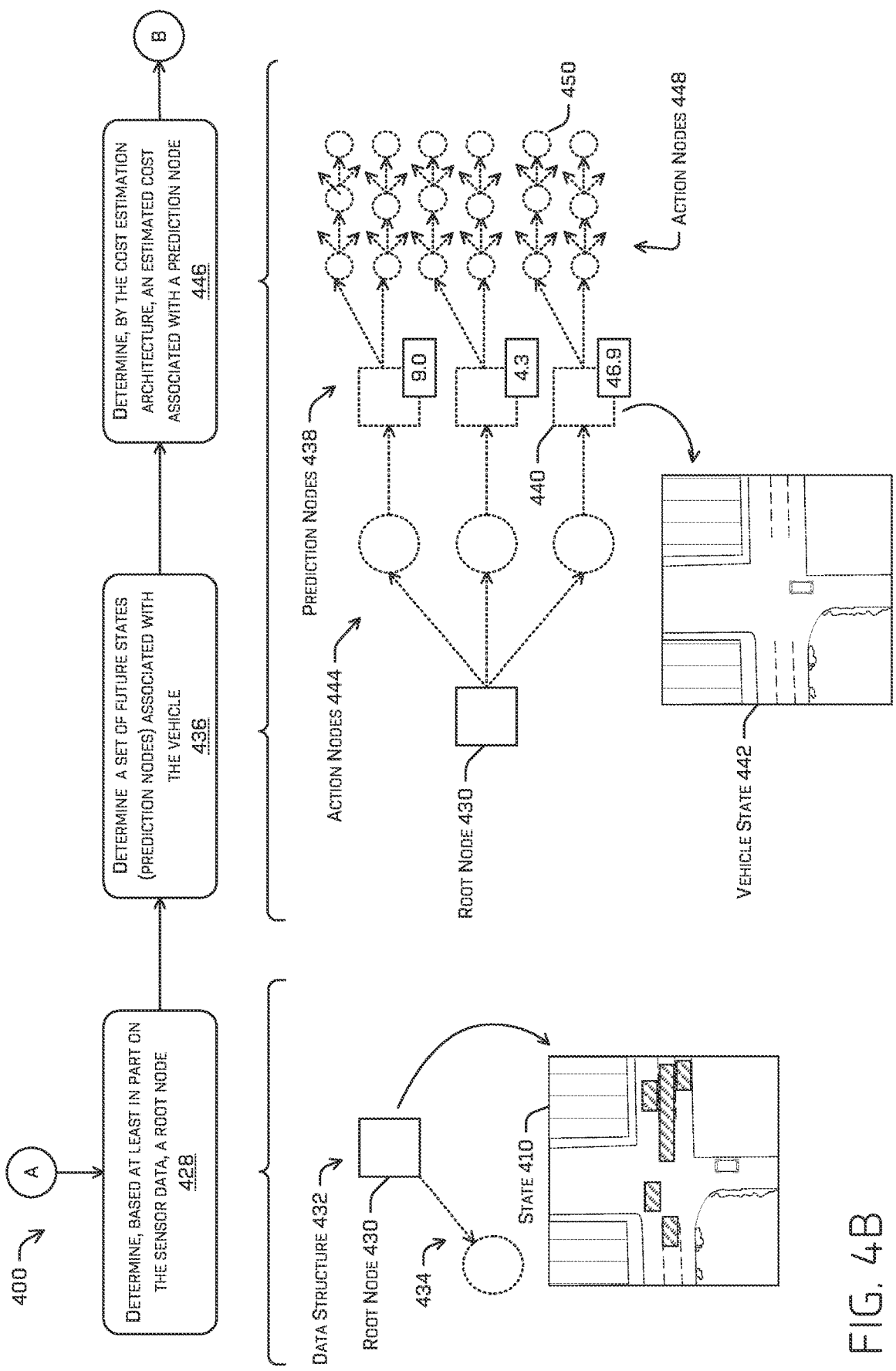
Figure 4C:
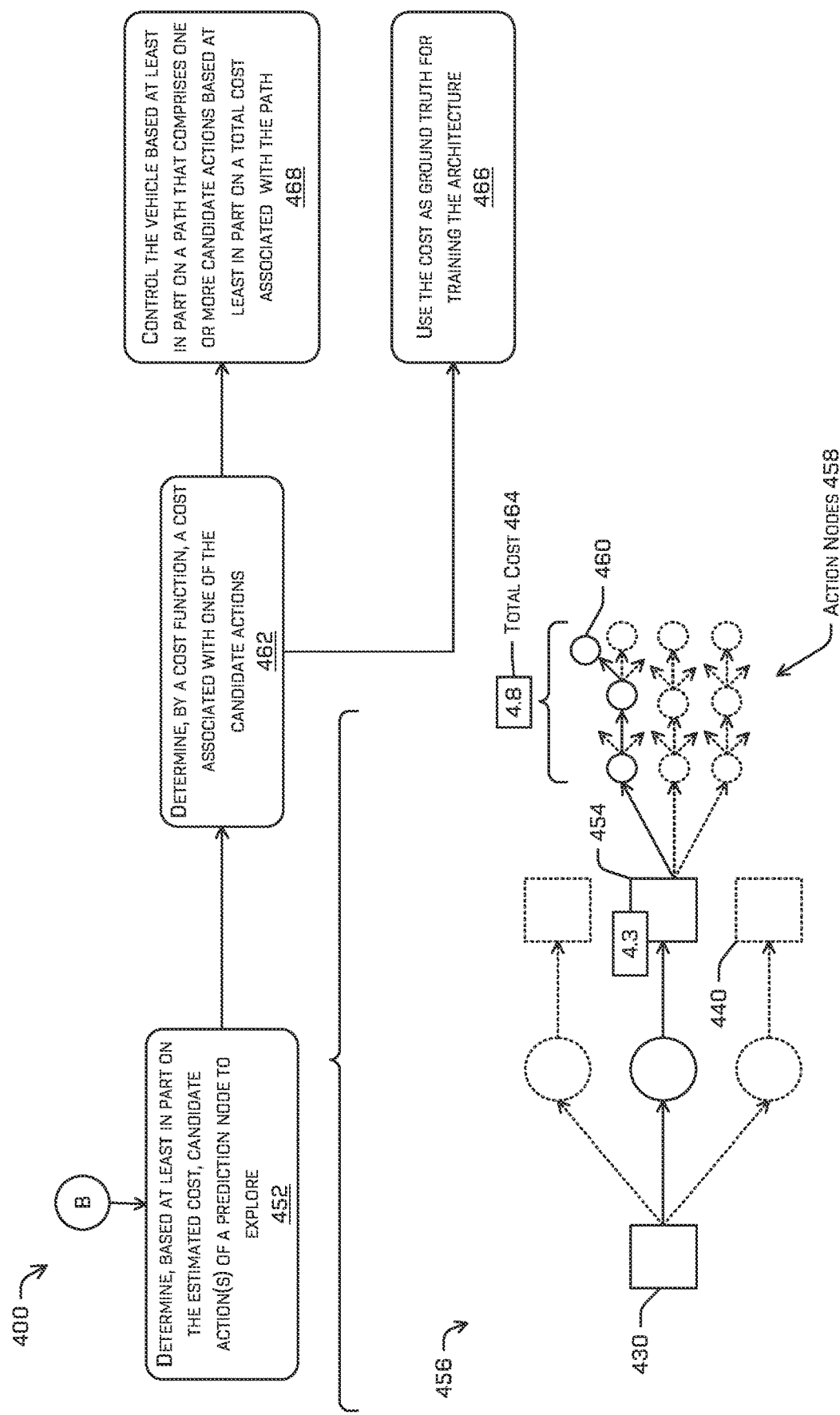

FIGS. 4A-4C illustrate a pictorial flow diagram of an example process 400 for generating a path for controlling a vehicle (e.g., vehicle 202) a tree search that employs an estimated cost architecture, which may be determined based at least in part on sensor data, perception data determined from the sensor data, and/or map data. In some examples, example process 400 may be executed by a planning component (e.g., planning component 23) of the autonomous vehicle although, in at least some examples, example process 400 may be additionally or alternatively executed by a simulation component, perception component, and/or prediction component of the autonomous vehicle. In the latter example, the planning component may coordinate operations of the various components, such as by transmitting API requests to APIs associated with each of the components and using the API responses to execute the tree search 232 discussed herein. In another example, the planning component may coordinate the operations of the component(s) using messages transmitted over a publish-subscribe network to/from the various components. In some examples, the tree search may include executing a Monte-Carlo tree search (MCTS); partially observable Monte-Carlo planning (POMCP); Markov decision process (MDP), such as a partially observable MDP (POMDP); or the like improved with the techniques discussed herein, including the estimated cost(s) determined by the cost estimation architecture.

At operation 402, example process 400 may comprise receiving a route associated with at least a start position in an environment, according to any of the techniques discussed herein. FIG. 4A depicts an environment 404 in which a vehicle 406 is located that is executing example process 400. Vehicle 406 may represent vehicle 202. The start position may be associated with a current position of the vehicle 406 and the route may specify an end position and may, in some examples, include intervening targets or operations, such as exiting a freeway, seeking to stay in a particular lane, targeting parking on a particular block (but not a particular position, although in some examples, a particular portion of the block may be identified), etc. In various examples, such a route may comprise a general geometric path from a current or start position to a destination or end position which may, in at least some examples, align with portions of a map. Such routes may be determined by one or more components on the vehicle and/or received from a remote computing device to determine an optimal series of connected segments (e.g., based on time to arrival, battery life, policies, etc.) accounting for various constraints.

At operation 408, example process 400 may comprise receiving sensor data from one or more sensors, according to any of the techniques discussed herein. The sensor(s) may be associated with the vehicle and/or another computing device. Operation 408 may additionally or alternatively comprise determining environment state data based at least in part on the sensor data. In some examples, the perception component may determine parts of state data 410. For example, the perception component may detect static and/or dynamic objects in the environment based at least in part on sensor data. The state data 410 may be associated with a most recently received set of sensor data (e.g., a current time, although there may be a small delay between receiving the sensor data and determining the perception data).

To further illustrate, the perception component may determine dynamic state data which may comprise a position, orientation, and/or characteristics of the vehicle 406 in the environment, which may correspond to real-time operation of an autonomous vehicle. The dynamic state data 410 may additionally or alternatively comprise an indication of an object type associated with one or more objects (e.g., passenger vehicle 412, oversized vehicle 414, passenger vehicle 416) and/or characteristics associated with the one or more objects (e.g., a position, velocity, acceleration, heading, material type, kinematic coefficient). Additionally or alternatively, the perception component may determine static object data that augments map data retrieved from a memory to form environment state data. In the depicted example, this may include building 418, building 420, and the objects detected as being static, indicated with vertical hashes (static object(s) 426). Objects classified as being dynamic (moving or capable of movement) are indicated using diagonal hashes (dynamic objects 422). Note that the state data 410 is represented as a two-dimensional image, although, in additional or alternate examples, the state data 410 may comprise a data structure, such as a pub-sub message, a three-dimensional representation, and/or the like. In some examples, the state data 410 may further comprise a prediction of whether an occluded object exists, as discussed in more detail in U.S. Pat. No. 11,231,481, filed May 8, 2019, the entirety of which is incorporated by reference herein, or similar thereto. In an additional or alternate example, the prediction of whether an occluded object exists may be determined by a machine-learned model that receives the environment state data as input and outputs a field of likelihoods. Any region of the environment associated with a likelihood that meets or exceeds a threshold may be output as a potential false negative, which may be used as part of the candidate action generation.

The state data may comprise an object classified by the perception component as being dynamic. For example, a dynamic object, which may also be referred to herein as an agent, may comprise a vehicle, a bicyclist, pedestrian, a ball, a wind-blown plastic bag, and/or any other moveable object or object that is likely to move within a time period. An object such as a bench or table may be moveable but, in a time period relevant to operation of the vehicle, is unlikely to move and may be considered a static object. The state data 410 may include dynamic object(s) and may include a dynamic object classification and/or likelihood determined by the agent filter in association with a dynamic object. For example, the classification may include whether a dynamic object is passive or reactive and/or a likelihood thereof.

Turning to FIG. 4B, at operation 428, example process 400 may comprise determining, based at least in part on the sensor data and/or state data 410, a root node 430 of the tree search, according to any of the techniques discussed herein. For example, the root node 430 may indicate a current state of the vehicle that may comprise localization data determined by a SLAM algorithm based at least in part on sensor data, velocity determined from wheel speed encoders, steering angle determined based at least in part on sensor(s) in the steering rack, and/or the like. In some examples, determining the root node may comprise determining a data structure 432 for the tree search, which may comprise setting up and storing a directed acyclical graph (DAG); upper confidence bounds applied to trees (UCT); determinized sparse partially observable tree (DESPOT); or the like for modeling control states and environment states. The root node may be associated with a current time and/or the most recent sensor data or batch of sensor data. As such, the root node may be associated with perception data that may or may not include prediction node data. In other words, the root node may identify environment state data that includes a current position, orientation, velocity, acceleration, classification, etc. of static and/or dynamic objects (including similar information for the vehicle, which may be generated by the localization component of the vehicle) in the environment and may additionally or alternatively include historical data of the same.

Predictions of how the object(s) will behave in the future, correspondingly how this data will change in the future, may be associated with the prediction node(s) discussed herein and, in some examples, the prediction node data for a current time step may be associated with the root node. In other words, the root node may include the current state of the environment, including the object(s) therein, localization data related to the vehicle (e.g., determined by SLAM), and/or prediction node data identifying one or more possible future states of the environment, which may include a position, orientation, velocity, acceleration, classification, etc. of an object associated with a future time.

The figures depict prediction nodes (and the root node, which may be a prediction node) as squares, and action nodes as circles. A prediction node may encode a future state and prediction node data indicating how that future state would be reached, which may include an indication of one or more candidate actions it would take to reach that future state. The dashed line and circle 434 represent the relationship between the root node 430 and an as-of-yet undiscovered/undetermined action node that is based on the root node 430. The root node 430 may identify the state data 410 and one or more predicted environment scenarios associated with a current time. For simplicity only the current state data is displayed in FIGS. 4A-4C for the sake of space, although predicted state data may additionally be associated with the root node 430.

At operation 436, example process 400 may comprise determining a set of candidate future states associated with the vehicle. In some examples, a set of future states may be generated for the prediction node that is being explored, which in the depicted example is only the root node so far. In further iterations, the set of future states may be based at least in part on a prediction node that was determined according to operation 446. This set of candidate future states may be indicated as prediction nodes 438 (depicted as squares) as part of the tree search, and may be determined by sampling a state space that is constrained based at least in part on the vehicle state indicated by prediction node upon which the set of future states is based (as indicated by the dashed arrows). For example, this may include sampling a space of kinematically achievable vehicle states according to braking, steering, and/or acceleration constraints of the vehicle and the vehicle's state indicated by the previous prediction node, which may include the position, heading, velocity, and/or steering angle of the vehicle at that state. For example, prediction node 440 may indicate the vehicle state 442 where the vehicle has progressed straight from the last position of the vehicle.

In an additional or alternate example, the future states (and corresponding prediction nodes) may be determined based at least in part on one or more candidate actions, each of which may be represented by an action node in the tree search. For example, FIG. 4B depicts a set of prediction nodes 438 that have been determined based at least in part on respective candidate actions indicated by action nodes 444, depicted as circles (dashed circles because none of the prediction nodes have, as of yet, been selected for further exploration). A candidate action may comprise, in some examples, a control policy for the vehicle, which may include a series of positions for the vehicle to follow, associated with different times (which inherently, limits or creates a target velocity for the vehicle). The vehicle may use this control policy to determine a steering angle, steering rate, and/or velocity over time to accomplish this control policy. Additionally or alternatively, a candidate action may comprise a set of controls over time defining position, velocity, and steering angle to be achieved at particular times.

At operation 446, example process 400 may comprise determining, by the cost estimation architecture, an estimated cost associated with a prediction node, such as prediction node 440. In some examples, the cost estimation architecture may output a set of cost estimates where each cost estimate is associated with a prediction node of the furthermost layer in the tree search, which in the illustrates case would include a cost estimate associated with each of prediction nodes 438. As discussed further herein, the cost estimation architecture may generate the cost estimation based at least in part on environment state data, dynamic object data, and prediction node data that indicates how the prediction node was reached in the tree search. For example, FIG. 3B depicts these estimated costs as numbers in boxes associated with each of the prediction nodes 438. A first estimated cost determined for a first prediction node is "9.0," a second estimated cost determined for a second prediction node is "4.3," and a third estimated cost determined for a first prediction node is "46.9." Note that although there are three prediction nodes in the depicted example, any number of prediction nodes could be created, and although the cost estimate is depicted as a positive decimal greater than 1, the costs may be normalized, such as in a logarithmic scale or normalized across the cost estimates.

The estimated cost of a target prediction node may be an estimate of what the lowest cost output of the cost function for one or more actions that may follow the target prediction node would be. For example, FIG. 4B depicts some of the potential candidate actions as action nodes 448 that may follow each of the prediction nodes 438 up to a termination point (e.g., an end point, a horizon time, an m-th node, or the like). As discussed later, the cost function may be used to determine a cost associated with each candidate action based at least in part on several factors and to keep a running total of a trace from the prediction node to a final node associated with a termination point (e.g., by adding each cost of sequential candidate actions to the total), such as action node 450. For example, the total cost associated with a path to action node 450 would include a sum of each of the costs of the action nodes that intervene between the action node 450 and the prediction node 440. Once a path and total cost for each has been determined for multiple paths (series of action nodes) reaching the termination point, path that is associated with a lowest total cost, as determined by the cost function, may be determined. This minimum cost path is discussed in more detail below.

Note that, although FIG. 4B depicts just action nodes following the prediction nodes 438, it is understood that an action node may result in a new prediction node that indicates a resultant state of the vehicle/environment/dynamic objects, although, in some examples, these may be left out for the sake of determining the total cost associated with a path.

At operation 452, example process 400 may comprise determining, based at least in part on the estimated cost, candidate action(s) of a prediction node 448 to explore. Operation 452 may include determining that the estimated cost associated with the prediction node associated with the estimated cost, "4.3," was a minimum estimated cost from among the set of estimated costs determined by the cost estimation architecture for a most recent layer of prediction nodes, i.e., prediction nodes 454 in the depicted example. Moreover, operation 452 may comprise determining a set of candidate actions that would cause the vehicle to reach a termination point stemming from a future state indicated by the target prediction node 448. In the depicted example this would include determining a set of candidate actions that would cause the vehicle to transition from the state indicated by the prediction node 454 to a termination point (e.g., a termination event, a displacement along the route is achieved, a location is reached, a number of time steps has been reached (e.g., actions up to a time horizon have been determined), a predefined number of action nodes has been generated, a time limit for the computation has been reached, and/or a computation or storage limit has been reached). The data structure 432 may be updated as data structure 456 to add the prediction node 454 and action nodes each indicating a different one of the candidate actions in the set that are based at least in part on prediction node 454. FIG. 4C depicts these action nodes as action nodes 458, each of which may be associated with a different candidate action for achieving a future state associated with prediction node 448. For example, a path may comprise any action nodes up to prediction node and a series of action nodes up to a termination point. In the depicted example, this could include the solid action nodes leading up to action node 460, which may be an action node associated with a termination point, such as reaching a maximum displacement along the route as compared to the other action nodes.

In some examples, each candidate action in the series leading up to action node 46670 may be associated with controlling the vehicle over different time periods (e.g., each candidate action comprises controls or a control policy for the vehicle to achieve over a time period). In some examples, the time periods associated with each subsequent layer of action nodes may be equal or, in an additional or alternate example, the time periods may increase in length (e.g., exponentially, logarithmically). For example, a first candidate action may be associated with controlling the vehicle over a 0.5 second period, a second candidate action associated with an action node one layer deeper than the first layer (e.g., action node) may control the vehicle over an additional 0.75 second period, a third candidate action in a third layer may control the vehicle over a period of 1 second, and so on. This increasing time period may ensure that a greater precision and/or accuracy is obtained for imminent actions, while also ensuring that the more distant actions won't control the vehicle in a manner that results in higher costs/negative outcomes.

At operation 462, example process 400 may comprise determining, by a cost function, a cost associated with one of the candidate actions. In some examples, this cost may be a sub-cost as part of determining a total cost 464 for a series of candidate actions that, together, form a path to a termination point. For example, the total cost 464 of the path comprising the solid action nodes may comprise sub-costs determined for each of the candidate actions indicated by the action nodes making up the path. In some examples, a total cost may be determined for each potential path, such as the other paths depicted in dotted lines. Note that FIG. 4C also depicts other potential connections to other unillustrated action nodes as mere arrows and that the number of action nodes and resultant paths is limited by space. The number of candidate nodes and paths may be greater or lesser than what is depicted and the number of layers of nodes may be greater or lesser than what is depicted. A layer may include nodes of a same vertical column. Moreover, one or more action nodes may be associated with an undepicted prediction node that indicates a predicted state that would result based at least in part on the candidate action(s) indicated by one or more candidate nodes. This predicted state may be based at least in part on a simulation/prediction of dynamic object data and/or environment states, which may include signage changes, signal changes, and/or the like.

In some examples, determining the cost may be determined based at least in part on simulating dynamic object(s) position(s), velocity(ies), and/or the like relative to the vehicle as the vehicle is simulated as traversing the candidate action. Additionally or alternatively, the cost function may determine a variety of sub-costs such as proximity cost(s), safety cost(s), comfort cost(s), and/or progress cost(s). These sub-costs may be based at least in part on the state data indicated by the last prediction node (whether the last prediction node is the root node or another prediction node). The proximity cost(s) may be based at least in part on a minimum, average, or other distance that the candidate action would take the vehicle from a static and/or dynamic object as the vehicle traverses the candidate action. The safety cost(s) may include a score indicating conformance to rules of the road, proximity to other object(s), and/or proximity to a non-drivable surface (e.g., sidewalk, building, closed lane). The comfort cost(s) may be based at least in part on a jerk and/or acceleration associated with the candidate action and/or whether the candidate action would violate a threshold jerk and/or acceleration. The progress cost(s) may be based at least in part on completion of a mission or sub-goal (e.g., parking at a portion on a block, parking within a block, changing lanes); displacement of the vehicle along the route; and/or deviation of the vehicle from a center of a lane, deviation from a desired lane for accomplish the route, or deviation from the route. For example, the progress cost(s) may reward the further the vehicle would be along the route if the candidate action were executed. A cost that is calculated as a reward may have an opposite sign as the other sub-costs. For example, if there is a positive cost for a candidate action that would violate a comfort metric (e.g., the candidate action would exceed a threshold jerk), a reward may be a negative sub-cost.

In at least one example, the cost associated with a particular action node may include a cost of arrival (e.g., a sum of the costs of all the action node(s) leading up to that action node for any action node deeper than the first layer) and/or a cost to execute the action (e.g., which may include the cost(s) discussed above, such as the comfort cost(s), progress cost(s), etc.), and/or a cost to progress further after that action node, which may be the minimum or average estimated cost for a next layer of prediction nodes after the target prediction node 448 (undepicted due to spatial constraints).

In other words, the cost function includes a variety of computations that are based on both simulated and non-simulated data. The cost determined by the cost function may be used to determine one candidate action from among multiple candidate actions for use to construct a path for controlling the vehicle. In at least one example, determining the simulation/prediction may comprise executing a prediction component of the vehicle, which may execute a Kalman filter, machine-learned model, and/or a simulation. Running a simulation may comprise instantiating the simulation based at least in part on the environment state data and the first candidate action. The instantiation may use a set of template models that may include representations of various objects, such as three different passenger vehicle models, four different pedestrian models, and/or the like, which may be scaled and positioned as appropriate to match the state data indicated by the prediction node upon which the candidate action was based. Any number of different models may exist. In some examples, a template model may comprise a three-dimensional model of a surface of an object without any texturing, although in additional or alternate examples, the model may comprise texture, or a two-dimensional top-down representation of such objects. The template model may comprise a polygon mesh, a triangle mesh, top-down representation of a portion of the environment that is occupied by different objects, and/or the like. In some examples, models associated with dynamic objects may have a higher polygon count than models associated with static objects for examples where a three-dimensional representation is used. In yet another example, objects in the simulation may be simplified to basic two-dimensional or three-dimensional geometric shapes, corresponding with the dimensionality of the simulation. For example, vehicles and/or pedestrians may be represented as rectangles of different shapes, pedestrians may be represented as cylinders or circles, etc.

Once the simulation is complete (e.g., upon completing the candidate action in the prediction/simulation), the resulting predicted track(s) (e.g., position(s), orientation(s), etc. as discussed above) of the object(s) in the environment, including vehicle 306's resultant track from executing the first candidate action, may be used to determine updated environment state data and/or prediction node data associated with the objects. The data structure 456 may be updated to include a prediction node 454 and/or any prediction nodes associated with action nodes 458 that indicates this updated environment state data and the prediction node data associated with the dynamic object(s) as a result of the prediction/simulation that may result from implementing the first candidate action. In some examples, the simulation may be re-executed using slightly different variables (e.g., changing a propensity of a dynamic object from "conservative" to "aggressive," "deferential," or "nominal") to determine alternate updated environment state to additionally or alternatively associate with prediction node 454 and/or any prediction nodes associated with action nodes 458. In some examples, the simulation component may output multiple potential scenarios, each of which may be associated with a likelihood. In such an example, the tree search may create a prediction node for each potential (predicted) scenario that is associated with a likelihood that meets or exceeds a likelihood threshold or the different scenarios may all be associated with a same prediction node.

At operation 466, example process 400 may comprise using the cost determined at operation 462 as ground truth for training the cost estimation architecture discussed herein. For example, the estimated cost determined in association with the prediction node 454 may be compared to the cost(s) determined by the cost function. For example, the estimated cost may be compared to the minimum total cost from among multiple total costs associated with the different possible paths that stem from prediction node 454. In particular, a training system may determine a loss (e.g., L1 loss, L2 loss, Huber loss, square root of the mean squared error, or another loss function) based at least in part on a difference between the estimated cost and the cost. This loss may be used in a gradient descent or other technique for modifying one or more parameters of different components of the cost estimation architecture to reduce the loss. For example, the parameter may comprise a weight/coefficient, bias, kernel values or characteristics, and/or the like. In the depicted example, the loss may determined based at least in part on a difference between the estimated cost associated with prediction node 454, "4.3," and the total cost 464, indicated as being "4.8," which may have been the lowest total cost among the paths that were generated based at least in part on prediction node 454. During training, the cost function may be used to determine a cost associated with a prediction node that was not selected for exploration. For example, the cost function may be used to determine costs associated with all the prediction nodes or a subset of the prediction nodes and an aggregate loss or separate losses may be determined based at least in part on differences between the costs determined by the cost function and estimated costs determined by the cost estimation architecture discussed herein.

At operation 468, example process 400 may comprise controlling the vehicle based at least in part on a path that comprises one or more candidate actions based at least in part on a total cost associated with the path. For example, the process 400 may comprise iteratively repeating operations 436, 446, 462, and 462 until an end point along the route is reached or a time horizon is reached (e.g., part of a Bellman update). Additionally or alternatively, the path may comprise one or more candidate actions following the prediction node 454. The planning component may determine the path by determining a series of action nodes and a series of predicted nodes that are associated with a lowest total cost or a cost that is below a threshold total cost to determine the path. In other words, the path may comprise the candidate actions indicated by the solid candidate nodes leading up to candidate node 461 (associated with the end point or a time horizon) that are based on prediction node 454. Additionally or alternatively, the process 400 may iteratively repeat this process until a termination event, such as determining a predefined number of action nodes, a time limit for the computation, a computation or storage limit, a displacement along the route is achieved, or a number of time steps has been reached (e.g., actions up to a time horizon have been determined), etc.

During this process, the planning component may keep a running total of the estimated costs and/or the costs determined by the cost function to determine the total cost of the path that has been explored so far in the tree search. In some examples, the path may further comprise candidate actions associated with action nodes that come before the prediction node 454 and the total cost may be a running total that includes cost(s) associated with such action nodes. In some examples, the planning component may revert to an earlier prediction node in the tree search if the total cost meets or exceeds an upper total cost threshold. In such an instance, the planning component may exclude previously explored prediction nodes from consideration unless exploring a different prediction node results in a higher total cost.

In some examples, the tree search may determine one or more contiguous paths through the sets of action nodes as the sets of nodes are generated and/or termination event occurs/an end point is reached. In some examples, the tree search may trace one or more potential paths through the sets of action nodes as they are generated and back-trace a lowest-cost path (i.e., from a node at the end of the potential path in a last layer of nodes to a start point/the root node and/or at a current position of the vehicle) to ensure it is impact-free. Regardless, the tree search may determine a contiguous path through the sets of nodes that is associated with a lowest cost and/or that makes the most progress along the route. A contiguous path of action nodes is a set of nodes that are connected by a dependency in the data structure 432/456. For example, conducting the search may comprise determining a contiguous set of connections between nodes of the different sets of nodes from the root node to an action node in a deepest layer of the data structure 432/456. Determining the path may comprise searching for solutions in the multivariate space that maximize a combination of displacement along the route and lateral/azimuthal diversity among the solutions (or meet a diversity heuristic) and minimize cost based at least in part on the cost map in the time interval given. For example, the search algorithm may comprise an algorithm such as, for example D*, D*lite, Focused Dynamic A*, A*, LPA*, Dijkstra's algorithm, and/or the like, although other search algorithms for searching and/or generating a directed graph and/or a weighted directed graph may be used. In some examples, the search may be configured with a ruleset that may comprise one or more rules, e.g., specifying a boundary within which to determine the path (e.g., the boundary may be determined based at least in part on sensor data and/or a map), node connection rules (e.g., nodes may have only one parent node), and/or the like. In some examples, the search may comprise determining a directed graph between nodes of the sets of nodes. The directed graph may comprise a connection (e.g., edge) between a first node and a second node and/or weight (e.g., cost) associated with the connection.

In some examples, before conducting a full search for a path, the tree search may comprise determining if a previous path and/or previous connection determined by the guidance system is feasible (e.g., satisfies current constraints such as velocity, maximum steering angle, and/or boundaries; is impact-free; has a cost that is less than a cost threshold).

In some examples, the path determined by the tree search may be a coarse path. For example, the coarse path may identify a position, heading, velocity, and/or curvature of approach for the vehicle to track at a 1 second or 500 millisecond interval, but the components of the vehicle may require or be capable of control over a finer time interval (e.g., 10 milliseconds, 100 milliseconds). In other words, the coarse path may not be smooth enough for the vehicle to track without significant errors. In some examples, a processor of a first type (e.g., a graphics processing unit (GPU)) may determine the prediction nodes and action nodes and/or determine the path and a processor of a second type may smooth the path generated by the GPU and/or determine a trajectory for controlling the vehicle based at least in part on the smooth path.

The tree search discussed herein may identify a path as feasible and/or determine a confidence score associated with the path based at least in part on the costs discussed herein. The tree search may output the path and/or confidence score, which the autonomous vehicle may use to control motion of the autonomous vehicle, e.g., by generating a trajectory based at least in part on the path. In some examples, the tree search may output a primary path and/or a contingent path. For example, the tree search may determine the contingent path based at least in part on generating a set of candidate paths, determining that the set comprises two groups of candidate paths based at least in part on a threshold distance (e.g., the two groups may be two distinct homotopic groups), and selecting a primary path from a first group and a contingent path from the second group. In some examples, the primary path may be selected as the primary path based at least in part on determining that the primary path is associated with a first total cost that is less than a second total cost associated with the contingent path. The primary path may be associated with a first total cost and/or the contingent path may be associated with a second total cost that is/are less than a cost threshold and/or may be minimum costs of the respective groups associated therewith. As such, the techniques described above may reduce the total computational requirements to identify and evaluate the most likely branches of a tree to explore. Of course, though described in the context of guidance of a tree search of trajectories for an autonomous vehicle, similar techniques may be applied in other tree search techniques.

Example Cost Estimation Architecture Input Data

Figure 5:
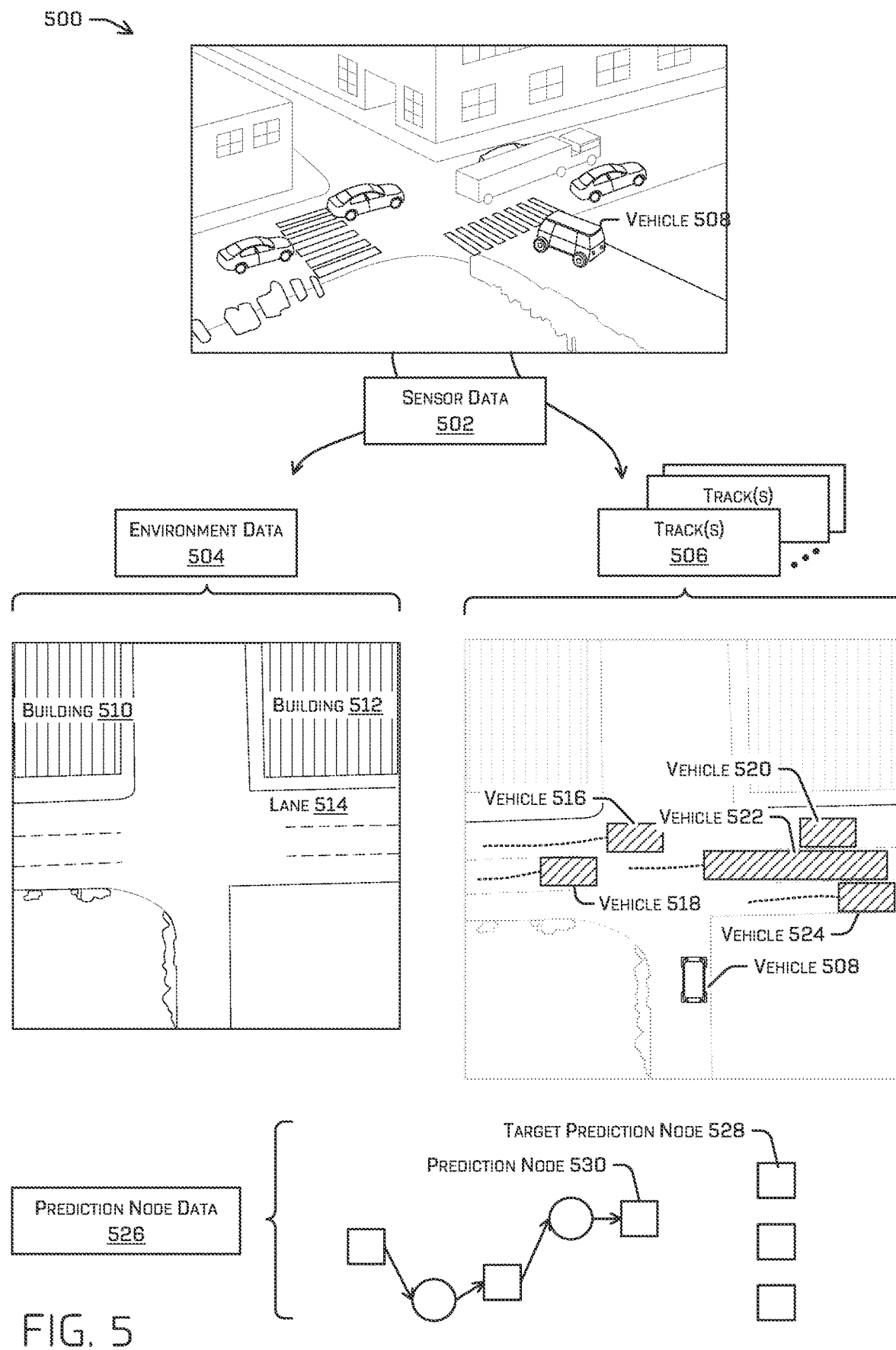
FIG. 5 depicts example representations of environment data, track(s), and prediction node data used as input for the cost estimate architecture.

FIG. 5 depicts example representations of environment state data, track(s), and prediction node data used as input for the cost estimate architecture discussed herein for an example scenario 500. The vehicle 202 may receive sensor data 502 and may use the sensor data to determine environment state data 504 and track(s) 506 (also called dynamic object data herein). The environment state data map comprise map data retrieved from memory that may be a pre-generated map that indicates the location, orientation, and/or classification of various objects, such as, for example, roadways, lanes, signage (e.g., traffic signs, traffic lights, billboards, crosswalk hashes, taxi zone indicators), buildings, permanent objects, construction, known occlusion data based on the position of vehicle 508 (which may represent vehicle 202) determined using the localization component of the vehicle, etc. The vehicle 508 may further augment the environment state data with data determined based at least in part on sensor data and/or the route determined by the vehicle according to a mission. For example, the vehicle 508 may aggregate with the map data static object(s) detected by a perception component of the vehicle, signal state data (e.g., traffic light indications, commuter lane signal states), and/or a route that the vehicle 508 generated based at least in part on a mission received by the vehicle that may indicate passenger and/or package pickup and/or drop-off location(s).

The example environment state data 504 may include, for example, an indication of the locations of building 510, building 512, lane 514, location(s) and extents of sidewalks, the locations of static object(s), and/or any of the other discussed herein. In some examples, the environment state data may include a top-down representation of the environment having multiple channels, where each channel indicates the absence or existence of any of the data discussed herein. For example, at the portion of the environment state data associated with the building 510, a channel of the environment state data may be set to indicate the existence of a building, such as by a binary indication, and a channel associated with crosswalks may indicated that no crosswalk exists at the same space occupied by building 510. As can be perceived by this example, there are examples where different channels may both indicate the existence of a feature. For example, a roadway channel may indicate that a portion of the environment is associated with a roadway, a lane channel may also indicate that that portion is also associated with a lane, and a crosswalk channel may also indicate that that portion is also associated with a crosswalk.

The vehicle 508 may additionally or alternatively determine a track associated with a dynamic object detected by the perception component of the vehicle. For example, the vehicle 508 may assign an identifier to any object classified by an ML model of the perception component as being capable of movement and may associate that same identifier with all data generated by the perception component that relates to that same object. This data may collectively be aggregated over time to form a track that identifies a current and historical state of such an object. This state may indicate the position, orientation, classification, velocity, acceleration, sub-state (e.g., vehicle indicator state; pedestrian state such as walking, vehicle loading, intent to cross roadway; and/or the like), and/or the like. A track may therefore include this data over a previous time window, such as a time period extending from a current time to 3 seconds in the past, 5 seconds in the past, 10 seconds in the past, or any other suitable length of time. There may be as many track(s) as there are dynamic object(s) detected by the vehicle 508 or the track(s) may be limited to those within a predefined distance of the vehicle, where the predefined distance may be based at least in part on a velocity of the vehicle 508 and/or of a velocity of a dynamic object detected by the vehicle 508. For example, there may be a track associated with each of vehicle 516, vehicle 518, vehicle 520, vehicle 522, and/or vehicle 424 illustrated in FIG. 5. The previous positions indicated by the different tracks are illustrated as dashed lines associated with each of the vehicles. Note that, although vehicle 520 may be occluded to one or more sensors of vehicle 508, vehicle 508 may maintain a track associated with vehicle 520 until an amount of time has passed before removing the track, so that the cost estimation architecture discussed herein can take into account potentially occluded objects.

FIG. 5 further illustrates an example of prediction node data 526 used by the vehicle as part of the input data for the cost estimation architecture discussed herein. As discussed above with reference to FIGS. 4A-4C, determining a cost associated with a candidate action to reach a prediction node may comprise predicting the location, orientation, velocity, and/or acceleration of an object and/or of the vehicle itself as it carries out the candidate action. The predicted state of objects in the environment that results from the candidate action that is ultimately selected by the tree search may be associated with the predicted node that is reached by the action node. The prediction node data 526 may comprise a data structure that encodes a trace. The trace may indicate the prediction node data associated with the prediction nodes and/or candidate nodes up to the prediction node for which a new cost estimate is being generate, e.g., target prediction node 528 in the depicted example. For example, the trace may indicate a series of candidate actions and/or future states that lead up to a target prediction node 528. The depicted example illustrates a series of prediction nodes as squares and action nodes selected to reach such prediction nodes as circles. The target prediction node 528 has two other peer prediction nodes in the same layer for which cost estimates may also be generated. In other words, the prediction node data 526 may be used for generated cost estimates for the target prediction node 528 and the other prediction nodes that are as-of-yet unexplored (hence the absence of any candidate actions connecting the previous prediction node to any of these nodes). At a high level, the prediction node data 526 encodes how prediction node 530 was reached and the predicted state of the environment/objects in the environment at that prediction node, which is associated with a future time.

Note that the prediction node data 526 may be different for two prediction nodes that have different parent prediction nodes since the two different prediction nodes would be associated with two different predicted states. In some examples, the prediction node data 526 and/or candidate node(s) may further indicate a position of such a node in the tree search, such as relevant to other nodes, a depth in the tree, and/or the like.

Example Cost Estimation Architecture

Figure 6:
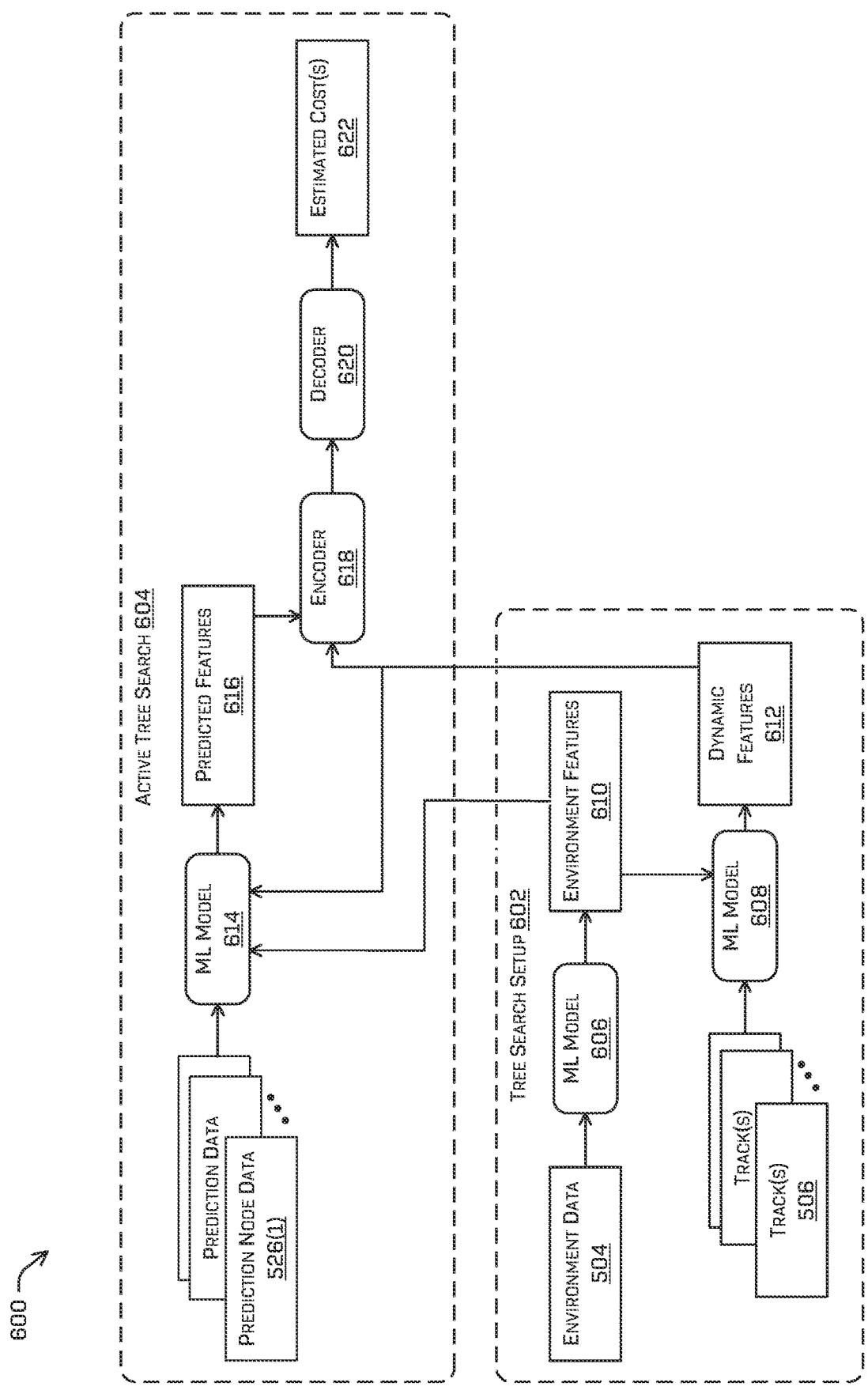
FIG. 6 depicts a block diagram of an example cost estimate architecture for use as part of a tree search to generate a trajectory for controlling a vehicle.

FIG. 6 depicts a block diagram of an example cost estimate architecture (architecture 600) for use as part of a tree search to generate a trajectory for controlling a vehicle. Architecture 600 may comprise two portions, which may execute at two different times: a tree search setup portion 602 and an active tree search portion 604. In some examples, tree search setup portion 602 may be executed at the beginning of a tree search before the first prediction node(s) are generated and does not need to be executed again during the tree search until a new path needs to be generated by the vehicle, which may include a new tree search.

The tree search setup portion 602 may comprise a first ML model 606 and a second ML model 608. The first ML model 606 may receive environment state data 504 as input and may be trained to output environment features 610. As discussed above, the environment state data 504 may be the portion of the state data that doesn't change throughout the tree search, such as the route, map data, static object detections, and the like. The environment features 610 output by the first ML model 606 may have no humanly-comprehensible general description, as they are merely a tensor full of values that have been trained to reduce the loss discussed herein. However, this tensor does still spatially represent the environment. For example, the environment features 610 may include an embedding. The environment features 610 comprise one or more values that may be associated with particular portion of the environment features 610 that is also associated with a particular portion of the environment. In other words, the environment features 610 may still be indexed by locations in the environment a portion of the environment features 610 may correspond one-to-one with a location in the environment. In some examples, the first ML model 606 may be a convolutional neural network or any other suitable neural network.

The tree search setup portion 602 may further comprise a second ML model 608 that receives track(s) 506 as input (also called dynamic object data) and is trained to determine dynamic features 612. Similarly to the first ML model 606, the dynamic features 612 generated by the second ML model 608 may not have a specific meaning discernible by humans, due to the nature of the training, but different portions of the dynamic features 612 are associated with different ones of the track(s). For example, the dynamic features 612 may include an embedding. More specifically, the embedding may be encoded as a graph where different nodes represent different object(s) and/or the vehicle and a tensor of hidden features (i.e., a tensor of values generated by the second ML model 608). Accordingly, a portion of the dynamic features 612 may be associated with one of the track(s) 506. Moreover, the portion of the dynamic features 612 associated with a particular one of the tracks may be associated with a portion of the environment features 610 and, accordingly, a portion of the environment. In some examples, the second ML model 608 may receive the environment features 610 as additional input and determining the dynamic features 612 may be further based at least in part on the environment features 610. In some examples, the second ML model 608 may comprise a graph-based recursive neural network (GRNN), in which case, the dynamic features 612 may comprise a tensor of embeddings, although any other suitable neural network or transformer may be used.

The active tree search 604 may comprise a third ML model that may be trained to determine predicted features 616 based at least in part on the prediction node data 526, environment features 610, and/or the dynamic features 612. The prediction node data 526 may be updated based at least in part on the most recently added layer of the data structure that is generated by the tree search. In some examples, there may be prediction node data for each prediction node for which the architecture 600 is determining an estimated cost. Moreover, determining the prediction node data for a target prediction node may comprise tracing from the target prediction node back to the root node to determine the parent prediction nodes that led to the target prediction node. The prediction node data may additionally or alternatively indicate where in the tree search the target prediction node is and/or a predicted state of the environment, the autonomous vehicle, and/or dynamic object(s) based at least in part on prediction/simulation associated with that target prediction node. The prediction node data 526 may encode or otherwise identify an aggregation of the predicted data from the root node to the parent node of the target prediction node or, in some examples, may indicate the prediction node data associated with the parent node of the target node. In examples where the architecture 600 predicts an estimated cost for each prediction node of a deepest layer of the prediction tree, the prediction node data 526 may comprise prediction node data for each of the prediction nodes of that deepest (explored) layer. In examples where the architecture 600 previously determined an estimated cost associated with a prediction node, the architecture 600 may skip determining an estimated cost associated with such a node. In examples where the prediction node data comprises multiple time steps associated with parent prediction nodes leading up to the target prediction node, the third ML model 614 is configured to handle the input as a time series (e.g., by including different input heads for the different time steps).

In some examples, the third ML model 614 may be initialized based at least in part on the dynamic features 612. For example, the third ML model 614 may comprise a graph RNN (GRNN) where a node of the GRNN may be associated with a dynamic object or the vehicle itself and a node state may be filled in using the corresponding node state of a node in the dynamic features 612 associated with that dynamic object or the vehicle. This may be repeated for as many object(s) as are represented in the dynamic features. Subsequent nodes associated with the predicted features may be determined by the third ML model 614 based at least in part on the prediction node data 526 and added to the graph that was initialized using the dynamic object features.

In some examples, instead of using the entire environment features 610, a portion of environment features 610 may be determined to be associated with a predicted location and/or area that an object is predicted to occupy according to the prediction node data. For example, the prediction node data may indicate a position, orientation, and/or portion of the environment occupied by an object, and a corresponding portion of the environment features 610 may be input into the ML model 614 in association with that prediction node data. In some examples, inputting a portion of the environment features 610 associated with a particular object may include appending the portion of the environment features 610 to a node of a GRNN associated with that object. In some examples, the portion of the environment features 610 input in association with particular prediction node data 526 may include a buffer around the object, such as 0.5 meters, 1 meter, 3 meters, 5 meters, or the like around the portion of the environment associated with the object.

In some examples, the third ML model 614 may comprise a GRNN trained to encode the interactions between the different dynamic object(s) and the vehicle 202 as predicted features 616. Again, the predicted features 616 may not be humanly-comprehensible, except that they may be indexed spatially according to the environment state data 504, such as may be represented by an embedding. For example, the GRNN outputs discussed herein may comprise a node associated with a dynamic object and an embedding that encodes the output of the respective ML model.

Note that the nodes of GRNNs discussed herein may differ from nodes of the tree search. The nodes of the GRNN are generated by the GRNN's trained functionality, whereas nodes of the tree search are generated according to a tree search algorithm.

The active tree search portion 604 may further comprise an encoder component 618 configured to received the predicted features 616 and dynamic features 612 as input and aggregate them as an encoded output. In some examples, the output of the encoder may be the result of an average polling between the dynamic features 612 and the predicted features 616, concatenating the dynamic features 612 to the predicted features 616, mean averaging between the dynamic features 612 and the predicted features 616, or using a transformer to generate the encoded output. In the latter example, the transformer may be a transformer neural network with self-attention configured to operate on graph(s). Ultimately, the encoder 618 may be invariant for the number of objects represented by the dynamic features 612 and the predicted features 616, such as a graph transformer network (GTN). In an additional or alternate example, the encoder component 618 may comprise a transformer. Regardless, the encoder component 618 may have parameters that are trained by the loss determined according to the techniques discussed herein.

The output of the encoder component 618 may be provided to a decoder component 620 that projects the encoder output into a feature space to determine estimated cost(s) 622, which may comprise a single estimated cost associated with a prediction node or multiple estimated costs, each of which is associated with a different prediction node. In some examples, the feature space may be bounded by the possible cost estimate outputs.

In some examples, the first machine-learned model 606, the second machine-learned model 608, and the third machine-learned model 614 are portions of a single machine-learned model. This single machine-learned model may additionally or alternatively include the encoder 618 and/or decoder 620.

Figure 7:
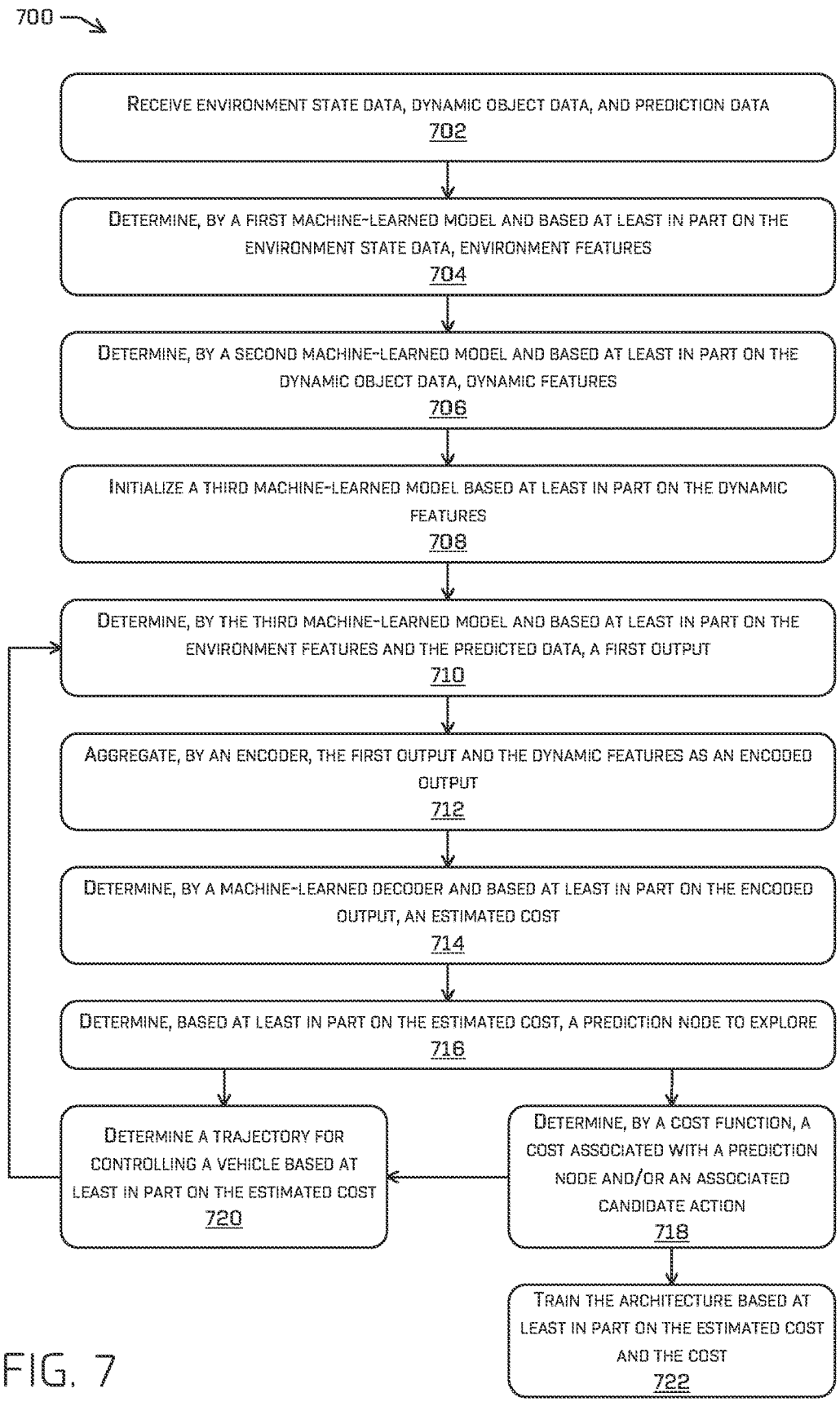
FIG. 7 depicts a flow diagram of an example process for generating a cost estimate using the cost estimate architecture and an example process for generating ground truth data for training such an architecture.

Example Process to Determine a Cost Estimate for a Tree Search Using the Cost Estimation Architecture FIG. 7 depicts a flow diagram of an example process 700 for generating a cost estimate using the cost estimate architecture and an example process for generating ground truth data for training such an architecture. In some examples, example process 700 may be executed by the vehicle 202 during inference or executed by the computing device(s) 214 during training of the cost estimation architecture. Regardless, example process 700 uses the cost estimation architecture 600.

At operation 702, example process 700 may comprise receiving environment state data, dynamic object data (e.g., one or more tracks), and prediction node data, according to any of the techniques discussed herein. For example, the environment state data may include environment state data 504, dynamic object data may include track(s) 506, and prediction node data may include prediction node data 526.

At operation 704, example process 700 may comprise determining, by a first machine-learned model and based at least in part on the environment state data, environment features 610, according to any of the techniques discussed herein.

At operation 706, example process 700 may comprise determining, by a second machine-learned model and based at least in part on the dynamic object data, dynamic features 612, according to any of the techniques discussed herein.

At operation 708, example process 700 may comprise initializing a third machine-learned model based at least in part on the dynamic features, according to any of the techniques discussed herein. For example, the third ML model 614 may comprise a graph RNN (GRNN) where a node of the GRNN may be associated with a dynamic object or the vehicle itself and a node state may be filled in using the corresponding node state of a node in the dynamic features 612 associated with that dynamic object or the vehicle. This may be repeated for as many object(s) as are represented in the dynamic features. Subsequent nodes associated with the predicted features may be determined by the third ML model 614 based at least in part on the prediction node data 526 and added to the graph that was initialized using the dynamic object features.

At operation 710, example process 700 may comprise determining, by a third machine-learned model and based at least in part on the environment features and the predicted data, a first output, according to any of the techniques discussed herein. For example, the first output may comprise the predicted features 616. In some examples, the dynamic features 612 may also be provided as input to the third machine-learned model in addition to or instead of initializing the third machine-learned model based at least in part on the dynamic features.

At operation 712, example process 700 may comprise aggregating, by an encoder, the first output and the dynamic features as an encoded output, according to any of the techniques discussed herein.

At operation 714, example process 700 may comprise determining, by a decoder and based at least in part on the encoded output an estimated cost, according to any of the techniques discussed herein. The estimated cost may be associated with a particular (target) prediction node of the tree search. In some examples, the estimated cost may be an estimated total cost (of one or a series of candidate actions) to reach a termination point from a future state indicated by a target prediction node. In some examples, operation 714 may comprise a batch output comprise multiple cost estimates, each of which may be associated with a different prediction node.

At operation 716, example process 700 may comprise determining, based at least in part on the estimated cost, a prediction node to explore. For example, example process 700 may include determining an estimated cost for each prediction node of a deepest layer of a tree search. Determining which prediction node to explore, from among multiple prediction nodes, may include determining that the determined prediction node is associated with an estimated cost that is less than a threshold, less than n other estimated costs, and/or is the lowest n estimated cost(s). Exploring a prediction node may comprise determining one or more candidate trajectories sufficient to achieve a future state indicated by that prediction node from a state indicated by a parent prediction node. In some examples, example process 700 may continue directly to operation 720 (and leave operation 718 for training). In additional or alternate examples, example process 700 may continue to operation 718 before operation 720.

At operation 718, example process 700 may comprise determining, by a cost function, a cost associated with a prediction node, according to any of the techniques discussed herein. For example, operation 718 may comprise determining one or more candidate actions to reach a termination point from a future state indicated by the prediction node and determining a cost by the cost function for a series of candidate actions that would achieve reach the termination point. In some examples, multiple variations of candidate action series may be generated to explore the potential paths that may be taken to a termination point and a minimum cost path may be determined. This cost may be based at least in part on a prediction of how close the candidate action or path (i.e., series of candidate actions) would cause the autonomous vehicle to pass static object(s) and/or dynamic object(s); a proximity of the autonomous vehicle to non-drivable surface(s); a velocity, acceleration, and/or jerk associated with the candidate action; a short-term goal cost (e.g., displacement/progress along a route, parking, achieving a soft objective indicated by a teleoperations device), etc.

At operation 720, example process 700 may comprise determining a trajectory for controlling a vehicle based at least in part on the estimated cost, according to any of the techniques discussed herein. For example, operation 720 may include determining a candidate action or series of candidate actions generated based on the prediction node selected according to the estimated cost. This series of candidate actions may be associated with a lowest cost determined by the cost function, from among multiple costs and series of candidate actions; a candidate action/series associated with a cost below a cost threshold; a candidate action/series associated with a cost below m number of other costs; or the like. Example process 700 may be iterated, from operations 710-720, to generate a next candidate action to link with a last candidate action to form a path. For example, iterating operations 710-720 may include continue to generate prediction nodes, determining estimated costs associated therewith, determining a prediction node to explore, determining candidate actions to reach a termination point beyond the prediction node, determining one or more candidate actions to add to the path, and so on until an end point or another termination point is reached.

At operation 720, example process 700 may comprise training the cost estimation architecture based at least in part on the estimated cost and the cost determined by the cost function, according to any of the techniques discussed herein. In some examples, operation 720 may comprise determining a loss based at least in part on a difference between the estimated cost determined by the cost estimation architecture and the cost determined by the cost function. Parameter(s) of one or more components of the architecture 600 may be modified to reduce the loss. For example, the loss may be backpropagated, using gradient descent, through ML model 606, ML model 608, ML model 614, encoder component 618, and/or decoder component 620. In some examples, the architecture 600 may be trained in two stages. The active tree search 604 may be trained independently of the tree search setup 602. In additional or alternate examples, the active tree search 604 may have parameter(s) frozen (unmodifiable) while the tree search setup 602 is modifiable and vice versa.

If an update to the cost function is received, operation 718 may be revisited to re-determine the cost function and a new loss may be determined to train the architecture 600. In some examples, predicted nodes having high estimated costs or high costs determined by the cost function may be purposefully generated and explored so that the architecture 600 may be trained to correctly indicate costs, i.e., thereby balancing the training data. For example, a high cost trajectory may be one that would result in a collision, one that passes very close to an object, one that results in a jerk that meets or exceeds a threshold, and/or the like. In some examples, since during training, compute time is less of a concern, the cost function may determine costs for multiple prediction nodes, not just the prediction node that was explored, to generate further ground truth data for training the architecture 600. In some examples, the cost used for training may be the minimum cost from among multiple candidate actions for reaching a prediction node, an average cost of the candidate actions for reaching the prediction node, or the like.

Example Clauses

A: A system comprising: one or more processors; and a memory storing processor-executable instructions that, when executed by the one or more processors, cause the system to perform operations comprising: receiving environment state data indicating static characteristics of an environment associated with a vehicle; receiving dynamic object data indicating at least one of a historical or a current state of at least one of a dynamic object or the vehicle; receiving prediction node data indicating one or more actions performed by the vehicle to reach a future state indicated by a prediction node of a tree search, the future state comprising future vehicle state and at least one of a predicted environment state, or a predicted dynamic object state; determining, by a first machine-learned model and based at least in part on the environment state data, environment features; determining, by a second machine-learned model and based at least in part on the dynamic object data, dynamic features; initializing a third machine-learned model based at least in part on the dynamic features; determining, by the third machine-learned model and based at least in part on the environment features and the prediction node data, a first output; aggregating, by an encoder, the first output and the dynamic features as an encoded output; determining, by a decoder and based at least in part on the encoded output, an estimated cost; and determining a trajectory for controlling a vehicle based at least in part on the estimated cost.

B: The system of paragraph A, wherein: the estimated cost is associated with the prediction node indicating a predicted state of the environment, the dynamic object, and the vehicle at a future time; and the estimated cost estimates a total cost determined by a cost function for one or more candidate actions that may be taken by the vehicle at the future time based on the predicted state of the environment to reach a termination point.

C: The system of paragraph B, wherein determining the total cost associated with one or more candidate trajectories by the cost function comprises determining a cost associated with a first candidate action of the one or more candidate actions and wherein the cost function determines the cost based at least in part on at least one of: a proximity sub-cost based at least in part on a distance the first candidate action would bring the vehicle from an object location or predicted object location; a safety sub-cost associated with the first candidate action; a comfort sub-cost associated with the first candidate action; or a progress sub-cost associated with the first candidate action.

D: The system of either paragraph B or C, wherein the operations further comprising training at least one of the first machine-learned model, the second machine-learned model, the third machine-learned model, the encoder, or the decoder based at least in part on: determining a cost based at least in part on the cost function and a candidate action associated with the prediction node; determining a difference between the cost and the estimated cost; and altering a parameter of at least one of the first machine-learned model, the second machine-learned model, the third machine-learned model, the encoder, or the decoder to reduce the difference.

E: The system of any one of paragraphs A-D, wherein initializing the third machine-learned model comprises: determining a portion of the dynamic features associated with the dynamic object; and adding the portion of the dynamic features to at least one of a node or hidden layer of the third machine-learned model.

F: The system of any one of paragraphs A-E, wherein the first machine-learned model, the second machine-learned model, and the third machine-learned model are portions of a single machine-learned model.

G: A method comprising: receiving environment state data indicating static characteristics of an environment associated with a vehicle; receiving dynamic object data indicating at least one of a historical or a current state of at least one of a dynamic object or the vehicle;

determining, by a first machine-learned model and based at least in part on the environment state data, environment features; determining, by a second machine-learned model and based at least in part on the dynamic object data, dynamic features; initializing a third machine-learned model based at least in part on the dynamic features; determining, by the third machine-learned model and based at least in part on the environment features and prediction node data indicating one or more actions performed by the vehicle to reach a future state indicated by a prediction node of a tree search, a first output; aggregating, by an encoder, the first output and the dynamic features as an encoded output; determining, by a decoder and based at least in part on the encoded output, an estimated cost; and determining a trajectory for controlling a vehicle based at least in part on the estimated cost.

H: The method of paragraph G, wherein: the estimated cost is associated with the prediction node indicating a predicted state of the environment, the dynamic object, and the vehicle at a future time; and the estimated cost estimates a total cost output by a cost function for one or more candidate actions that may be taken by the vehicle at the future time based on the predicted state of the environment to reach a termination point.

I: The method of paragraph H, wherein determining the total cost associated with one or more candidate actions by the cost function comprises determining a cost associated with a first candidate action of the one or more candidate actions and wherein the cost function determines the cost based at least in part on at least one of: a proximity sub-cost based at least in part on a distance the first candidate action would bring the vehicle from an object location or predicted object location; a safety sub-cost associated with the first candidate action; a comfort sub-cost associated with the first candidate action; or a progress sub-cost associated with the first candidate action.

J: The method of either paragraph H or I, further comprising training at least one of the first machine-learned model, the second machine-learned model, the third machine-learned model, the encoder, or the decoder based at least in part on: determining a cost based at least in part on the cost function and a candidate action associated with the prediction node; determining a difference between the cost and the estimated cost; and altering a parameter of at least one of the first machine-learned model, the second machine-learned model, the third machine-learned model, the encoder, or the decoder to reduce the difference.

K: The method of any one of paragraphs G-J, wherein initializing the third machine-learned model comprises: determining a portion of the dynamic features associated with the dynamic object; and adding the portion of the dynamic features to at least one of a node or hidden layer of the third machine-learned model.

L: The method of any one of paragraphs G-K, wherein the first machine-learned model, the second machine-learned model, and the third machine-learned model are portions of a single machine-learned model.

M: The method of paragraph H, wherein: the prediction node is a first prediction node among a plurality of prediction nodes of the tree search and the estimated cost is a first estimated cost associated with the first prediction node; the method further comprises: determining multiple estimated costs associated with the plurality of prediction nodes, and determining that the first estimated cost is a lowest estimated cost from among the multiple estimated costs; and determining the trajectory comprises: determining, by the cost function, a cost for each of a different series of candidate actions that are based at least in part on a future state indicated by the first prediction node; and determining the trajectory based at least in part on a first series of candidate actions associated with a lowest cost.

N: A non-transitory computer-readable medium storing processor-executable instructions that, when executed by one or more processors, cause one or more processors to perform operations comprising: receiving environment state data indicating static characteristics of an environment associated with a vehicle; receiving dynamic object data indicating at least one of a historical or a current state of at least one of a dynamic object or the vehicle; determining, by a first machine-learned model and based at least in part on the environment state data, environment features; determining, by a second machine-learned model and based at least in part on the dynamic object data, dynamic features; initializing a third machine-learned model based at least in part on the dynamic features; determining, by the third machine-learned model and based at least in part on the environment features and prediction node data indicating one or more actions performed by the vehicle to reach a future state indicated by a prediction node of a tree search, a first output; aggregating, by an encoder, the first output and the dynamic features as an encoded output; determining, by a decoder and based at least in part on the encoded output, an estimated cost; and determining a trajectory for controlling a vehicle based at least in part on the estimated cost.

O: The non-transitory computer-readable medium of paragraph N, wherein: the estimated cost is associated with the prediction node indicating a predicted state of the environment, the dynamic object, and the vehicle at a future time; and the estimated cost estimates a total cost output by a cost function for one or more candidate actions that may be taken by the vehicle at the future time based on the predicted state of the environment to reach a termination point.

P: The non-transitory computer-readable medium of paragraph O, wherein determining the total cost associated with one or more candidate actions by the cost function comprises determining a cost associated with a first candidate action of the one or more candidate actions and wherein the cost function determines the cost based at least in part on at least one of: a proximity sub-cost based at least in part on a distance the first candidate action would bring the vehicle from an object location or predicted object location; a safety sub-cost associated with the first candidate action; a comfort sub-cost associated with the first candidate action; or a progress sub-cost associated with the first candidate action.

Q: The non-transitory computer-readable medium of either paragraph O or P, wherein the operations further comprise training at least one of the first machine-learned model, the second machine-learned model, the third machine-learned model, the encoder, or the decoder based at least in part on: determining a cost based at least in part on the cost function and a candidate action associated with the prediction node; determining a difference between the cost and the estimated cost; and altering a parameter of at least one of the first machine-learned model, the second machine-learned model, the third machine-learned model, the encoder, or the decoder to reduce the difference.

R: The non-transitory computer-readable medium of any one of paragraphs N-Q, wherein initializing the third machine-learned model comprises: determining a portion of the dynamic features associated with the dynamic object; and adding the portion of the dynamic features to at least one of a node or hidden layer of the third machine-learned model.

S: The non-transitory computer-readable medium of any one of paragraphs N-R, wherein the first machine-learned model, the second machine-learned model, and the third machine-learned model are portions of a single machine-learned model.

T: The non-transitory computer-readable medium of paragraph O, wherein: the prediction node is a first prediction node among a plurality of prediction nodes of the tree search and the estimated cost is a first estimated cost associated with the first prediction node; the operations further comprise: determining multiple estimated costs associated with the plurality of prediction nodes, and determining that the first estimated cost is a lowest estimated cost from among the multiple estimated costs; and determining the trajectory comprises: determining, by the cost function, a cost for each of a different series of candidate actions that are based at least in part on a future state indicated by the first prediction node; and determining the trajectory based at least in part on a first series of candidate actions associated with a lowest cost from among the costs associated with the different series of candidate actions.

U: The non-transitory computer-readable medium of paragraph Q, wherein the cost function is a first cost function, the cost is a first cost, the difference is a first difference, and the operations further comprise: receiving a second cost function; determining a second cost based at least in part on the second cost function and the candidate action associated with the prediction node; determining a second difference between the second cost and the estimated cost; and altering the parameter of at least one of the first machine-learned model, the second machine-learned model, the third machine-learned model, the encoder, or the machine-learned decoder to reduce the second difference.

V: The non-transitory computer-readable medium of any one of paragraphs O-U, wherein a candidate action of the one or more candidate actions comprises one or more of: a control policy for the vehicle to target, maintaining a trajectory, staying in a lane, changing lanes, accelerating, or decelerating.

While the example clauses described above are described with respect to one particular implementation, it should be understood that, in the context of this document, the content of the example clauses can also be implemented via a method, device, system, computer-readable medium, and/or another implementation. Additionally, any of examples A-V may be implemented alone or in combination with any other one or more of the examples A-V.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
a memory storing processor-executable instructions that, when executed by the one or more processors, cause the system to perform operations comprising:
receiving environment state data indicating static characteristics of an environment associated with a vehicle;
receiving dynamic object data indicating at least one of a historical or a current state of at least one of a dynamic object or the vehicle;
receiving prediction node data indicating one or more actions performed by the vehicle to reach a future state indicated by a prediction node of a tree search, the future state comprising a future vehicle state and at least one of a predicted environment state, or a predicted dynamic object state;
determining, by a first machine-learned model and based at least in part on the environment state data, environment features;
determining, by a second machine-learned model and based at least in part on the dynamic object data, dynamic features;
initializing a third machine-learned model based at least in part on the dynamic features, wherein the first machine-learned model, the second machine-learned model, and the third machine-learned model are distinct and have different types of inputs;
determining, by the third machine-learned model and based at least in part on the environment features and the prediction node data, a first output;
aggregating, by an encoder, the first output and the dynamic features as an encoded output;
determining, by a decoder and based at least in part on the encoded output, an estimated cost; and
determining a trajectory for controlling the vehicle based at least in part on the estimated cost.

2. The system of claim 1, wherein:
the estimated cost is associated with the prediction node indicating a predicted state of the environment, the dynamic object, and the vehicle at a future time; and
the estimated cost estimates a total cost determined by a cost function for one or more candidate actions that are potentially to be taken by the vehicle at the future time based on the predicted state of the environment to reach a termination point.

3. The system of claim 2, wherein the operations further comprise determining the total cost, determining the cost comprises determining a cost associated with a first candidate action of the one or more candidate actions, and the cost function determines the cost based at least in part on at least one of:
a proximity sub-cost based at least in part on a distance the first candidate action to bring the vehicle from an object location or predicted object location;
a safety sub-cost associated with the first candidate action;
a comfort sub-cost associated with the first candidate action; or
a progress sub-cost associated with the first candidate action.

4. The system of claim 2, wherein the operations further comprise training at least one of the first machine-learned model, the second machine-learned model, the third machine-learned model, the encoder, or the decoder based at least in part on:
determining a first cost based at least in part on the cost function and a candidate action associated with the prediction node;
determining a difference between the first cost and the estimated cost; and
altering a parameter of at least one of the first machine-learned model, the second machine-learned model, the third machine-learned model, the encoder, or the decoder to reduce the difference.

5. The system of claim 1, wherein initializing the third machine-learned model comprises:
determining a portion of the dynamic features associated with the dynamic object; and
adding the portion of the dynamic features to at least one of a node or a hidden layer of the third machine-learned model.

6. The system of claim 1, wherein the first machine-learned model, the second machine-learned model, and the third machine-learned model are portions of a single machine-learned model.

7. A method comprising:
receiving environment state data indicating static characteristics of an environment associated with a vehicle;
receiving dynamic object data indicating at least one of a historical or a current state of at least one of a dynamic object or the vehicle;
determining, by a first machine-learned model and based at least in part on the environment state data, environment features;
determining, by a second machine-learned model and based at least in part on the dynamic object data, dynamic features;
initializing a third machine-learned model based at least in part on the dynamic features, wherein the first machine-learned model, the second machine-learned model, and the third machine-learned model are distinct and have different types of inputs;
determining, by the third machine-learned model and based at least in part on the environment features and prediction node data indicating one or more actions performed by the vehicle to reach a future state indicated by a prediction node of a tree search, a first output;
aggregating, by an encoder, the first output and the dynamic features as an encoded output;
determining, by a decoder and based at least in part on the encoded output, an estimated cost; and
determining a trajectory for controlling the vehicle based at least in part on the estimated cost.

8. The method of claim 7, wherein:
the estimated cost is associated with the prediction node indicating a predicted state of the environment, the dynamic object, and the vehicle at a future time; and
the estimated cost estimates a total cost output by a cost function for one or more candidate actions that are potentially to be taken by the vehicle at the future time based on the predicted state of the environment to reach a termination point.

9. The method of claim 8, further comprising: determining the total cost, determining the cost comprises determining a cost associated with a first candidate action of the one or more candidate actions, and the cost function determines the cost based at least in part on at least one of:
- a proximity sub-cost based at least in part on a distance the first candidate action to bring the vehicle from an object location or predicted object location;
- a safety sub-cost associated with the first candidate action;
- a comfort sub-cost associated with the first candidate action; or
- a progress sub-cost associated with the first candidate action.

10. The method of claim 8, further comprising training at least one of the first machine-learned model, the second machine-learned model, the third machine-learned model, the encoder, or the decoder based at least in part on:
- determining a first cost based at least in part on the cost function and a candidate action associated with the prediction node;
- determining a difference between the first cost and the estimated cost; and
- altering a parameter of at least one of the first machine-learned model, the second machine-learned model, the third machine-learned model, the encoder, or the decoder to reduce the difference.

11. The method of claim 8, wherein:
the prediction node is a first prediction node among a plurality of prediction nodes of the tree search and the estimated cost is a first estimated cost associated with the first prediction node; and
the method further comprises:
- determining multiple estimated costs associated with the plurality of prediction nodes, and
- determining that the first estimated cost is a lowest estimated cost from among the multiple estimated costs; and
- determining the trajectory comprises:
  - determining, by the cost function, a respective cost for each of a different series of candidate actions that are based at least in part on a corresponding future state indicated by the first prediction node; and
  - determining the trajectory based at least in part on a first series of candidate actions associated with a lowest cost.

12. The method of claim 7, wherein initializing the third machine-learned model comprises:
- determining a portion of the dynamic features associated with the dynamic object; and
- adding the portion of the dynamic features to at least one of a node or a hidden layer of the third machine-learned model.

13. The method of claim 7, wherein the first machine-learned model, the second machine-learned model, and the third machine-learned model are portions of a single machine-learned model.

14. A non-transitory computer-readable medium storing processor-executable instructions that, when executed by one or more processors, cause one or more processors to perform operations comprising:
- receiving environment state data indicating static characteristics of an environment associated with a vehicle;
- receiving dynamic object data indicating at least one of a historical or a current state of at least one of a dynamic object or the vehicle;
- determining, by a first machine-learned model and based at least in part on the environment state data, environment features;
- determining, by a second machine-learned model and based at least in part on the dynamic object data, dynamic features;
- initializing a third machine-learned model based at least in part on the dynamic features, wherein the first machine-learned model, the second machine-learned model, and the third machine-learned model are distinct and have different types of inputs;
- determining, by the third machine-learned model and based at least in part on the environment features and prediction node data indicating one or more actions performed by the vehicle to reach a future state indicated by a prediction node of a tree search, a first output;
- aggregating, by an encoder, the first output and the dynamic features as an encoded output;
- determining, by a decoder and based at least in part on the encoded output, an estimated cost; and
- determining a trajectory for controlling the vehicle based at least in part on the estimated cost.

15. The non-transitory computer-readable medium of claim 14, wherein:
- the estimated cost is associated with the prediction node indicating a predicted state of the environment, the dynamic object, and the vehicle at a future time; and
- the estimated cost estimates a total cost output by a cost function for one or more candidate actions that are potentially to be taken by the vehicle at the future time based on the predicted state of the environment to reach a termination point.

16. The non-transitory computer-readable medium of claim 15, wherein the operations further comprise determining the total cost, determining the cost comprises determining a cost associated with a first candidate action of the one or more candidate actions, and the cost function determines the cost based at least in part on at least one of:
- a proximity sub-cost based at least in part on a distance the first candidate action to bring the vehicle from an object location or predicted object location;
- a safety sub-cost associated with the first candidate action;
- a comfort sub-cost associated with the first candidate action; or
- a progress sub-cost associated with the first candidate action.

17. The non-transitory computer-readable medium of claim 15, wherein the operations further comprise training at least one of the first machine-learned model, the second machine-learned model, the third machine-learned model, the encoder, or the decoder based at least in part on:
- determining a first cost based at least in part on the cost function and a candidate action associated with the prediction node;
- determining a difference between the first cost and the estimated cost; and
- altering a parameter of at least one of the first machine-learned model, the second machine-learned model, the third machine-learned model, the encoder, or the decoder to reduce the difference.

18. The non-transitory computer-readable medium of claim 17, wherein the cost function is a first cost function, the difference is a first difference, and the operations further comprise:
- receiving a second cost function;
- determining a second cost based at least in part on the second cost function and the candidate action associated with the prediction node;

determining a second difference between the second cost and the estimated cost; and altering the parameter of at least one of the first machine-learned model, the second machine-learned model, the third machine-learned model, the encoder, or the machine-learned decoder to reduce the second difference.

19. The non-transitory computer-readable medium of claim 15, wherein:

the prediction node is a first prediction node among a plurality of prediction nodes of the tree search and the estimated cost is a first estimated cost associated with the first prediction node; and the operations further comprise:

determining multiple estimated costs associated with the plurality of prediction nodes, and determining that the first estimated cost is a lowest estimated cost from among the multiple estimated costs; and determining the trajectory comprises:

determining, by the cost function, a respective cost for each of a different series of candidate actions that are based at least in part on a corresponding future state indicated by the first prediction node; and determining the trajectory based at least in part on a first series of candidate actions associated with a lowest cost from among corresponding costs associated with the different series of candidate actions.

20. The non-transitory computer-readable medium of claim 15, wherein a candidate action of the one or more candidate actions comprises one or more of:

a control policy for the vehicle to target, maintaining a trajectory, staying in a lane, changing lanes, accelerating, or decelerating.

21. The non-transitory computer-readable medium of claim 14, wherein initializing the third machine-learned model comprises:

determining a portion of the dynamic features associated with the dynamic object; and adding the portion of the dynamic features to at least one of a node or a hidden layer of the third machine-learned model.

22. The non-transitory computer-readable medium of claim 14, wherein the first machine-learned model, the second machine-learned model, and the third machine-learned model are portions of a single machine-learned model.

* * * * *